US012393523B2

(12) United States Patent
Durham

(10) Patent No.: US 12,393,523 B2
(45) Date of Patent: Aug. 19, 2025

(54) CIRCUITRY AND METHODS FOR IMPLEMENTING MICRO-CONTEXT BASED TRUST DOMAINS

(71) Applicant: Intel Corporation, Santa Clara, CA (US)

(72) Inventor: David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 627 days.

(21) Appl. No.: 17/709,867

(22) Filed: Mar. 31, 2022

(65) Prior Publication Data

US 2023/0315648 A1 Oct. 5, 2023

(51) Int. Cl.
G06F 12/14 (2006.01)
G06F 9/455 (2018.01)
G06F 12/0882 (2016.01)

(52) U.S. Cl.
CPC ...... G06F 12/1441 (2013.01); G06F 9/45558 (2013.01); G06F 12/0882 (2013.01);
(Continued)

(58) Field of Classification Search
CPC . G06F 2009/45583; G06F 2009/45587; G06F 2212/7201; G06F 2212/1052; G06F 2212/152; G06F 2212/657
See application file for complete search history.

(56) References Cited

U.S. PATENT DOCUMENTS 3,916,385 A 10/1975 Parmar et al.
4,809,160 A 2/1989 Mahon et al.
(Continued)

FOREIGN PATENT DOCUMENTS

EP 0428079 A2 5/1991
JP 03-244054 A 10/1991
WO 2007/079011 A3 11/2007

OTHER PUBLICATIONS

"Intel(R) Trusted Execution Technology: Hardware-based Technology for Enhancing Server Platform Security", White Paper, 2012, 8 pages.
(Continued)

*Primary Examiner* — Yaima Rigol
(74) *Attorney, Agent, or Firm* — NICHOLSON DE VOS WEBSTER & ELLIOTT LLP

(57) ABSTRACT

Systems, methods, and apparatuses for implementing micro-context based trust domains are described. In one example, a system includes a hardware processor core to implement a trust domain manager to manage one or more hardware isolated virtual machines as a respective trust domain with a region of protected memory, and assign a micro-context identification value, that is not readable by privileged system code that is to execute on the hardware processor core, to each granule of a plurality of granules of physical memory of the protected memory (e.g., where a granule is a proper subset of a page of memory relating to a single object in memory); and a memory management circuit coupled between the hardware processor core and the physical memory, wherein the memory management circuit is to prevent data in the protected memory having a first micro-context identification value from being accessed by code based on the code having a different micro-context identification value.

24 Claims, 24 Drawing Sheets

(52) U.S. Cl.
CPC ........ *G06F 12/145* (2013.01); *G06F 12/1458* (2013.01); *G06F 2009/45583* (2013.01); *G06F 2009/45587* (2013.01); *G06F 2212/7201* (2013.01)

(56) References Cited

U.S. PATENT DOCUMENTS

| | | | |
|---|---|---|---|
| 4,821,169 | A | 4/1989 | Sites et al. |
| 5,809,564 | A | 9/1998 | Craze et al. |
| 6,009,503 | A | 12/1999 | Liedtke |
| 6,048,940 | A | 4/2000 | Blaedel et al. |
| 6,671,699 | B1 | 12/2003 | Black et al. |
| 6,694,450 | B1 | 2/2004 | Kidder et al. |
| 6,823,433 | B1 | 11/2004 | Barnes et al. |
| 7,401,234 | B2 | 7/2008 | Case et al. |
| 7,761,674 | B2 | 7/2010 | Durham et al. |
| 8,554,984 | B2 | 10/2013 | Yano et al. |
| 8,595,442 | B1 | 11/2013 | James-Roxby et al. |
| 9,026,866 | B2 | 5/2015 | Balasubramanian |
| 9,390,031 | B2 | 7/2016 | Durham et al. |
| 9,436,847 | B2 | 9/2016 | Durham et al. |
| 9,652,375 | B2 | 5/2017 | Stark et al. |
| 9,697,142 | B2 | 7/2017 | Koeberl et al. |
| 10,162,694 | B2 | 12/2018 | Stark et al. |
| 10,496,573 | B2 | 12/2019 | Schulz et al. |
| 10,565,132 | B2 | 2/2020 | Schulz et al. |
| 10,671,547 | B2 | 6/2020 | Koeberl et al. |
| 2004/0031030 | A1 | 2/2004 | Kidder et al. |
| 2004/0158775 | A1 | 8/2004 | Shibuya et al. |
| 2005/0193217 | A1 | 9/2005 | Case et al. |
| 2006/0187941 | A1 | 8/2006 | Andersen |
| 2006/0256877 | A1 | 11/2006 | Szczepanek et al. |
| 2006/0256878 | A1 | 11/2006 | Szczepanek et al. |
| 2007/0055837 | A1 | 3/2007 | Rajagopal et al. |
| 2007/0156999 | A1* | 7/2007 | Durham ............... G06F 12/1491 711/170 |
| 2008/0209282 | A1 | 8/2008 | Lee et al. |
| 2008/0244725 | A1* | 10/2008 | Dewan ................... G06F 9/545 726/13 |
| 2009/0172343 | A1* | 7/2009 | Savagaonkar .......... G06F 9/461 711/E12.059 |
| 2009/0271536 | A1 | 10/2009 | Tiennot |
| 2009/0292977 | A1 | 11/2009 | Bradley et al. |
| 2009/0327648 | A1* | 12/2009 | Savagaonkar ........ G06F 12/145 711/207 |
| 2010/0162038 | A1 | 6/2010 | Hulbert et al. |
| 2013/0227704 | A1* | 8/2013 | Boivie .................... G06F 21/54 726/27 |
| 2013/0232238 | A1* | 9/2013 | Cohn .................... H04W 12/08 709/220 |
| 2013/0318322 | A1 | 11/2013 | Shetty et al. |
| 2013/0326288 | A1 | 12/2013 | Datta et al. |
| 2014/0115283 | A1 | 4/2014 | Radovic et al. |
| 2014/0281354 | A1 | 9/2014 | Tkacik et al. |
| 2014/0372698 | A1 | 12/2014 | Lee et al. |
| 2016/0048378 | A1 | 2/2016 | Varma |
| 2016/0124802 | A1 | 5/2016 | Gabor et al. |
| 2016/0259682 | A1 | 9/2016 | Stark et al. |
| 2016/0283300 | A1 | 9/2016 | Stark et al. |
| 2016/0371139 | A1 | 12/2016 | Stark et al. |
| 2017/0177429 | A1 | 6/2017 | Stark et al. |
| 2018/0060250 | A1 | 3/2018 | Hildesheim et al. |
| 2018/0074715 | A1 | 3/2018 | Farmahini-Farahani et al. |
| 2019/0138755 | A1* | 5/2019 | Kida ....................... G06F 21/44 |
| 2020/0004953 | A1 | 1/2020 | Lemay et al. |
| 2021/0006395 | A1* | 1/2021 | Durham ................ H04L 9/0861 |
| 2021/0200546 | A1 | 7/2021 | Lemay et al. |

OTHER PUBLICATIONS

Advisory Action from U.S. Appl. No. 11/323,446, Apr. 17, 2012, 3 pages.

Angelo-Oracle. "SPARC M7 Chip—32 cores", Oracle.com, Aug. 15, 2014. Web. Accessed Dec. 21, 2015. 8 pages. URL: <http://blogs.oracle.com/rajadurai/entry/sparc_m7_chip_32_cores>.

Arm, "Arm® Architecture Reference Manual Supplement Morello for A-profile Architecture", Document No. DDI0606, Document Version: A.j, 2019-2021, 1288 pages.

Biin: "CPA Architecture Reference Manual", 1988, 401 pages.

Burow et al., "CUP: Comprehensive User-Space Protection for C/C++", Session 9: Software Security, ASIACCS'18, Jun. 4-8, 2018, pp. 381-392.

Carr et al., "DataShield: Configurable Data Confidentiality and Integrity", Asia CCS '17, Apr. 2-6, 2017, pp. 193-204.

Chen et al., "Shreds: Fine-grained Execution Units with Private Memory", IEEE Symposium on Security and Privacy, 2016, pp. 56-71.

CHERI, "Capability Hardware Enhanced RISC Instructions (CHERI)", available online at <https://www.cl.cam.ac.uk/research/security/ctsrd/cheri/>, 2010-2019, 2 pages.

Dartmouth, "ELFbac: Runtime Intent-Level ABI-Granular Memory Protection for Linux", available online at <https://www.cs.dartmouth.edu/~sergey/io/elfbac/>, retrieved on May 1, 2020, 1 page.

Duarte, "Memory Translation and Segmentation" Aug. 2008, p. 1-7.

Duck et al., "EffectiveSan: Type and Memory Error Detection using Dynamically Typed C/C++", PLDI'18, Jun. 18-22, 2018, pp. 181-195.

Final Office Action from U.S. Appl. No. 11/323,446, Dec. 30, 2011, 18 pages.

Final Office Action from U.S. Appl. No. 11/323,446, Jan. 17, 2013, 17 pages.

Final Office Action from U.S. Appl. No. 11/323,446, Jul. 16, 2015, 17 pages.

Final Office Action from U.S. Appl. No. 11/323,446, Jul. 28, 2014, 16 pages.

Final Office Action from U.S. Appl. No. 11/323,446, Jul. 7, 2009, 21 pages.

Final Office Action from U.S. Appl. No. 11/323,446, Oct. 15, 2010, 17 pages.

Final Office Action from U.S. Appl. No. 11/323,446, Sep. 20, 2013, 14 pages.

Gil et al., "There's a Hole in the Bottom of the C: On the Effectiveness of Allocation Protection", IEEE Cybersecurity Development (SecDev), Sep. 30-Oct. 2, 2018, 8 pages.

Gove, D., et al., "Detecting memory access errors," Nov. 25, 2015, 17 pages.

Gretton-Dann et al., "Arm A-Profile Architecture Developments 2018: Armv8.5-A", available online at <https://community.arm.com/developer/ip-products/processors/b/processors-ip-blog/posts/arm-a-profile-architecture-2018-developments-armv85a>, Sep. 17, 2018, 5 pages.

https://courses.cs.washington.edu/courses/cse351/17wi/lectures/CSE351-L02-memory-L17wi.pdfAuthor: Ceze; Title: CSE351:Memory, Data, & Addressing I, Date: Winter, 2017 (Year: 2017).

Intel, "Intel 64 and IA-32 Architectures Software Developer's Manual", vol. 3A, System Programming Guide, Part 1, Order No. 253668-060US, Sep. 2016, 468 pages.

International Preliminary Report on Patentability for Application No. PCT/US2006/048940, Jul. 1, 2008, 8 pages.

International Search Report and Written Opinion for Application No. PCT/US2006/048940, Sep. 25, 2007, 15 pages.

International Search Report and Written Opinion for Application No. PCT/US2016/063211, Mar. 7, 2017, 11 pages.

Introduction to SPARC M7 and Silicon Secured Memory (SSM), Retrieved from https://swisdev.oracle.com/_files/What-Is-SSM.html on Jul. 4, 2016, 2 pages.

Jeon et a., "HexType: Efficient Detection of Type Confusion Errors for C++", CCS '17, Session K3: Program Analysis, Oct. 2017, pp. 2373-2387.

Kwon et al., "Low-Fat Pointers: Compact Encoding and Efficient Gate-Level Implementation of Fat Pointers for Spatial Safety and Capability-based Security", Proceedings of the 2013 ACM SIGSAC Conference on Computer & Communications Security, 2013, pp. 721-732.

Lemay et al., "Cryptographic Capability Computing", Micro'21, pp. 253-267 (2021).

(56) References Cited

OTHER PUBLICATIONS

Liljestrand et al., "PAC it up: Towards Pointer Integrity using ARM Pointer Authentication", Cornell University, Nov. 22, 2018, 21 pages.
LogMeIn Support, "What is Privilege Separation in SSH?", available online at <https://web.archive.org/web/20191218064501/https://help.logmein.com/articles/en_US/FAQ/What-is-Privilege-Separation-in-SSH-en1>, Dec. 18, 2019, 1 page.
M. Rutland, "ARMv8.3 Pointer Authentication",, Linux Security Summit, Sep. 14, 2017, 24 slides.
Mahon M.J., et al., "Hewlett-Packard Precision Architecture: The Processor," Hewlett-Packard Journal, Aug. 1986, 19 pages.
McIlroy et al., "Spectre is Here to Stay: An Analysis of Side-Channels and Speculative Execution", Cornell University, Feb. 15, 2019, pp. 1-26.
Menon et al., "Shakti-T: A RISC-V Processor with Light Weight Security Extensions", Conference: the Hardware and Architectural Support for Security and Privacy, Jun. 25, 2017, 9 pages.
Miller, Matt, "Trends, Challenges, and Strategic Shifts in the Software Vulnerability Mitigation Landscape", Microsoft Security Response Center (MSRC), Feb. 7, 2019, 32 pages.
Min R., et al., "Improving Performance of Large Physically Indexed Caches by Decoupling Memory Addresses From Cache Addresses," IEEE Transactions on Computers, vol. 50, No. 11, Nov. 2001, pp. 1191-1201.
Nagarakatte et al., "CETS: Compiler-Enforced Temporal Safety for C", ISMM'10, Jun. 5-6, 2010, pp. 31-40.
Non-Final Office Action from U.S. Appl. No. 11/323,446, Apr. 23, 2010, 16 pages.
Non-Final Office Action from U.S. Appl. No. 11/323,446, Jan. 15, 2015, 18 pages.
Non-Final Office Action from U.S. Appl. No. 11/323,446, Jun. 22, 2012, 16 pages.
Non-Final Office Action from U.S. Appl. No. 11/323,446, Jun. 7, 2013, 18 pages.
Non-Final Office Action from U.S. Appl. No. 11/323,446, Mar. 15, 2011, 16 pages.
Non-Final Office Action from U.S. Appl. No. 11/323,446, Mar. 20, 2014, 15 pages.
Non-Final Office Action from U.S. Appl. No. 11/323,446, Nov. 5, 2015, 5 pages.
Non-Final Office Action from U.S. Appl. No. 11/323,446, Oct. 7, 2008, 17 pages.
Non-Final Office Action, U.S. Appl. No. 16/729,358, Sep. 16, 2020, 17 pages.
Notice of Allowance from U.S. Appl. No. 11/323,446, Mar. 14, 2016, 5 pages.
Notice of Allowance, U.S. Appl. No. 16/729,358, Jul. 6, 2021, 8 pages.
Qualcomm, "Pointer Authentication on ARMv8.3: Design and Analysis of the New Software Security Instructions", Jan. 2017, 12 pages.
Serebryany et al., "AddressSanitizer: A Fast Address Sanity Checker", 2012 Usenix Annual Technical Conference, Jun. 13-15, 2012, 10 pages.
Serebryany et al., "Memory Tagging And How It Improves C/C++ Memory Safety", Feb. 2018, 14 pages.
Serebryany et al., "Memory Tagging: How It Improves C/C++ Memory Safety" Google, LLVM Developers' Meeting, Oct. 2018, 29 slides.
Serebryany, Kostya, "Security: ARM Memory Tagging Extension and How It Improves C/C++ Memory Safety", vol. 44, No. 2, Summer 2019, pp. 12-16.
Suh et al., "Secure Program Execution via Dynamic Information Flow Tracking", ASPLOS'04, Oct. 9-13, 2004, pp. 85-96.
T. Nyman et al., "HardScope: Thwarting DOP attacks with Hardware-Assisted Run-time Scope Enforcement", May 2017, pp. 1-20.
The Chromium Projects, "Multi-Process Architecture", available online at <https://web.archive.org/web/20191030200549/https://www.chromium.org/developers/design-documents/multi-process-architecture>, Oct. 30, 2019, 2 pages.
Tsampas et al., "Towards Automatic Compartmentalization of C Programs on Capability Machines", In Proceedings of the International Conference on Foundations of Computer Science, 2017, 14 pages.
Vasilakis et al., "BreakApp: Automated, Flexible Application Compartmentalization", Network and Distributed Systems Security (NDSS) Symposium, Feb. 18-21, 2018, 15 pages.
Watson et al., "An Introduction to CHERI", University of Cambridge, Computer Laboratory, Technical Report, No. 941, Sep. 2019, 43 pages.
Watson et al., "Capability Hardware Enhanced RISC Instructions: CHERI Instruction-Set Architecture (Version 8)", University of Cambridge, Computer Laboratory, Technical Report, No. 951, Oct. 2020, 590 pages.
Watson et al., "CHERI: A Hybrid Capability-System Architecture for Scalable Software Compartmentalization", IEEE Symposium on Security and Privacy, 2015, pp. 20-37.
Watson, "Capsicum: Practical capabilities for UNIX", USENIX Security, 2010, 17 pages.
Wesley et al., "Cornucopia: Temporal Safety for CHERI Heaps", . In Proceedings of the 41st IEEE Symposium on Security and Privacy, 2020, pp. 1507-1524.
Wilkes J., et al., "A Comparison of Protection Lookaside Buffers and the PA-RISC Protection Architecture," Mar. 1992, Hewlett-Packard, 12 pages.
Xia et al., "CHERIvoke: Characterising Pointer Revocation using CHERI Capabilities for Temporal Memory Safety", MICRO '52, Oct. 2019, pp. 545-557.

\* cited by examiner

1100

```
┌─────────────────────────────────────────────────────────────────────────┐
│ MANAGING ONE OR MORE HARDWARE ISOLATED VIRTUAL MACHINES AS A RESPECTIVE │
│ TRUST DOMAIN WITH A REGION OF PROTECTED MEMORY BY A TRUST DOMAIN        │
│ MANAGER OF A HARDWARE PROCESSOR CORE                                    │
│ 1102                                                                    │
└─────────────────────────────────────────────────────────────────────────┘
                                    ↓
┌─────────────────────────────────────────────────────────────────────────┐
│ ASSIGNING A MICRO-CONTEXT IDENTIFICATION VALUE, THAT IS NOT READABLE BY │
│ PRIVILEGED SYSTEM CODE THAT IS EXECUTING ON THE HARDWARE PROCESSOR      │
│ CORE, TO EACH GRANULE OF A PLURALITY OF GRANULES OF PHYSICAL MEMORY OF  │
│ THE PROTECTED MEMORY BY THE TRUST DOMAIN MANAGER OF THE HARDWARE        │
│ PROCESSOR CORE                                                          │
│ 1104                                                                    │
└─────────────────────────────────────────────────────────────────────────┘
                                    ↓
┌─────────────────────────────────────────────────────────────────────────┐
│ ALLOWING, BY A MEMORY MANAGEMENT CIRCUIT COUPLED BETWEEN THE HARDWARE   │
│ PROCESSOR CORE AND THE PHYSICAL MEMORY, A FIRST MEMORY ACCESS OF DATA   │
│ IN THE PROTECTED MEMORY HAVING A FIRST MICRO-CONTEXT IDENTIFICATION     │
│ VALUE REQUESTED BY A FIRST CODE BASED ON THE FIRST CODE HAVING THE      │
│ FIRST MICRO-CONTEXT IDENTIFICATION VALUE                                │
│ 1106                                                                    │
└─────────────────────────────────────────────────────────────────────────┘
                                    ↓
┌─────────────────────────────────────────────────────────────────────────┐
│ PREVENTING, BY THE MEMORY MANAGEMENT CIRCUIT, A SECOND MEMORY ACCESS    │
│ OF THE DATA IN THE PROTECTED MEMORY HAVING THE FIRST MICRO-CONTEXT      │
│ IDENTIFICATION VALUE REQUESTED BY A SECOND CODE BASED ON THE SECOND     │
│ CODE HAVING A DIFFERENT MICRO-CONTEXT IDENTIFICATION VALUE              │
│ 1108                                                                    │
└─────────────────────────────────────────────────────────────────────────┘
```

FIG. 11

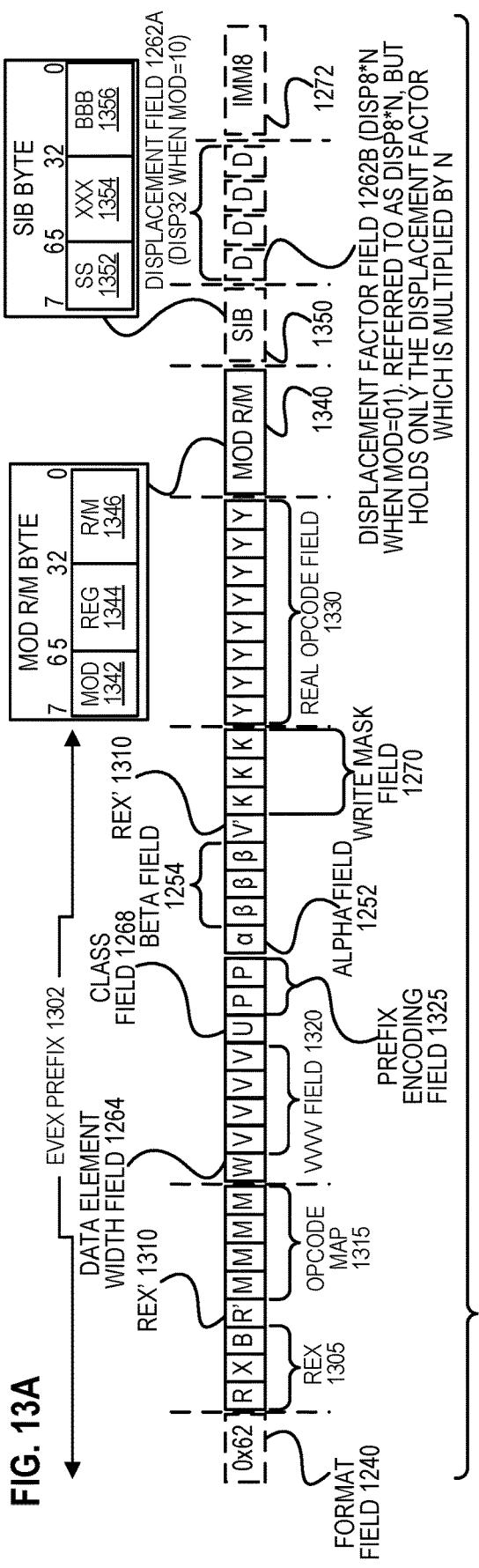
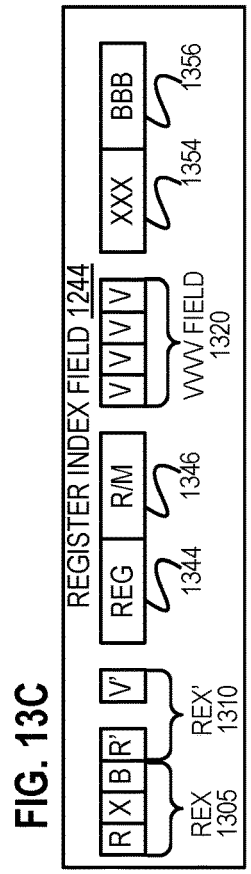
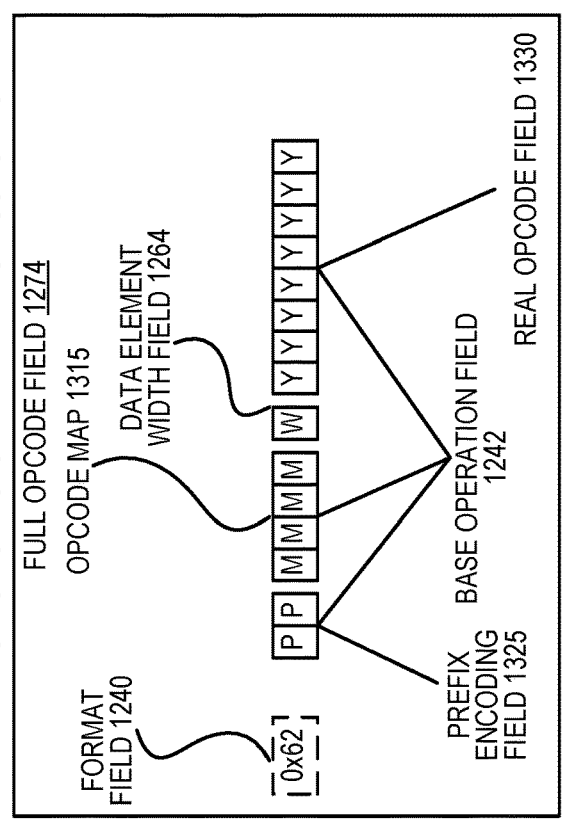
FIG. 13A
FIG. 13B
FIG. 13C

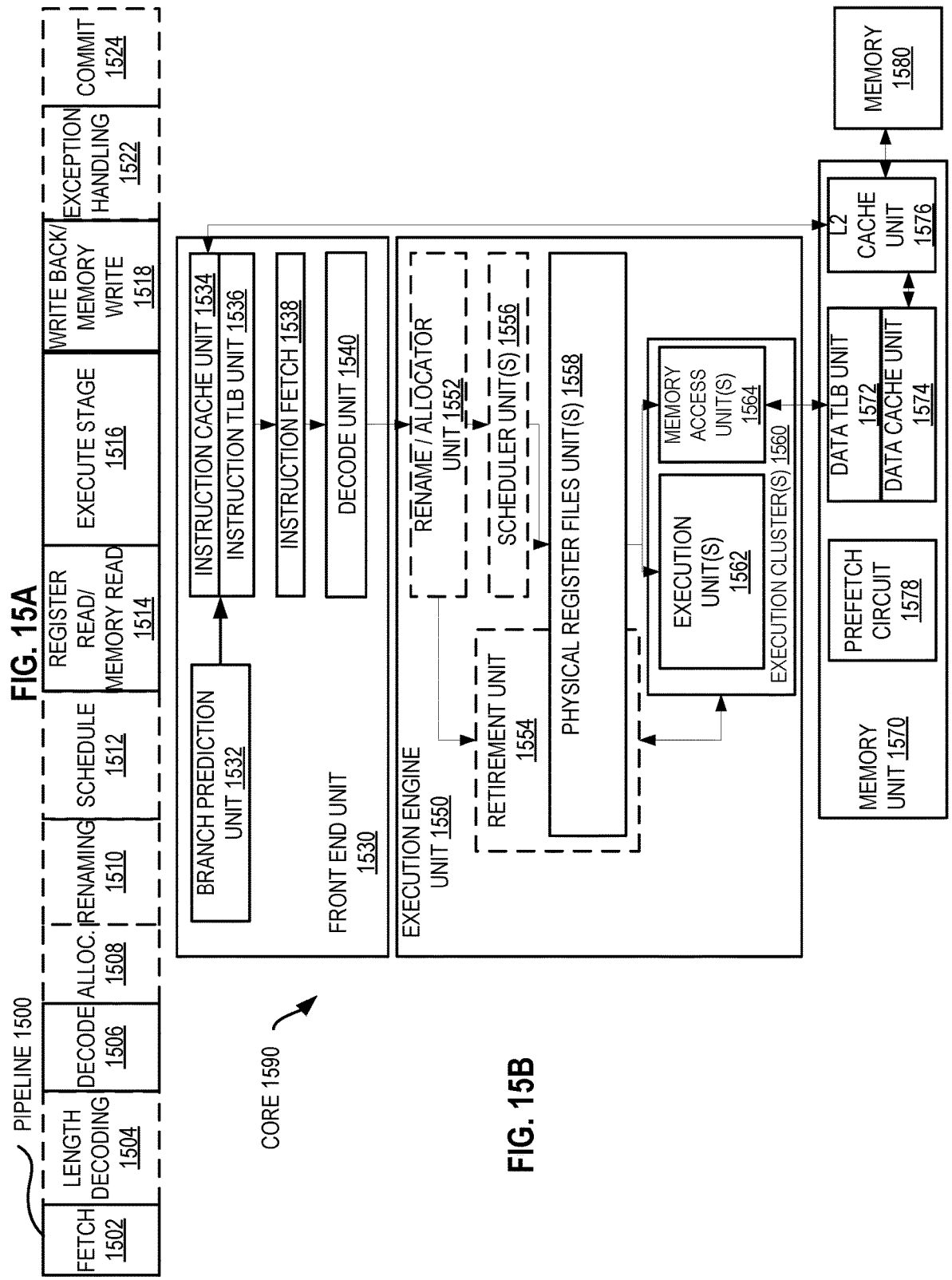

CIRCUITRY AND METHODS FOR IMPLEMENTING MICRO-CONTEXT BASED TRUST DOMAINS

TECHNICAL FIELD

The disclosure relates generally to electronics, and, more specifically, an example of the disclosure relates to circuitry for implementing micro-context based trust domains.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, and exception handling, and external input and output (IO). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 11 is a flow diagram illustrating operations of a method for allowing and preventing access to protected memory by a trust domain manager having a data structure for micro-contexts according to examples of the disclosure.

FIG. 13A is a block diagram illustrating fields for the generic vector friendly instruction formats in FIGS. 12A and 12B according to examples of the disclosure.

FIG. 13B is a block diagram illustrating the fields of the specific vector friendly instruction format in FIG. 13A that make up a full opcode field according to one example of the disclosure.

FIG. 13C is a block diagram illustrating the fields of the specific vector friendly instruction format in FIG. 13A that make up a register index field according to one example of the disclosure.

FIG. 15A is a block diagram illustrating both an exemplary in-order pipeline and an exemplary register renaming, out-of-order issue/execution pipeline according to examples of the disclosure.

FIG. 15B is a block diagram illustrating both an exemplary example of an in-order architecture core and an exemplary register renaming, out-of-order issue/execution architecture core to be included in a processor according to examples of the disclosure.

DETAILED DESCRIPTION

Figure 1:
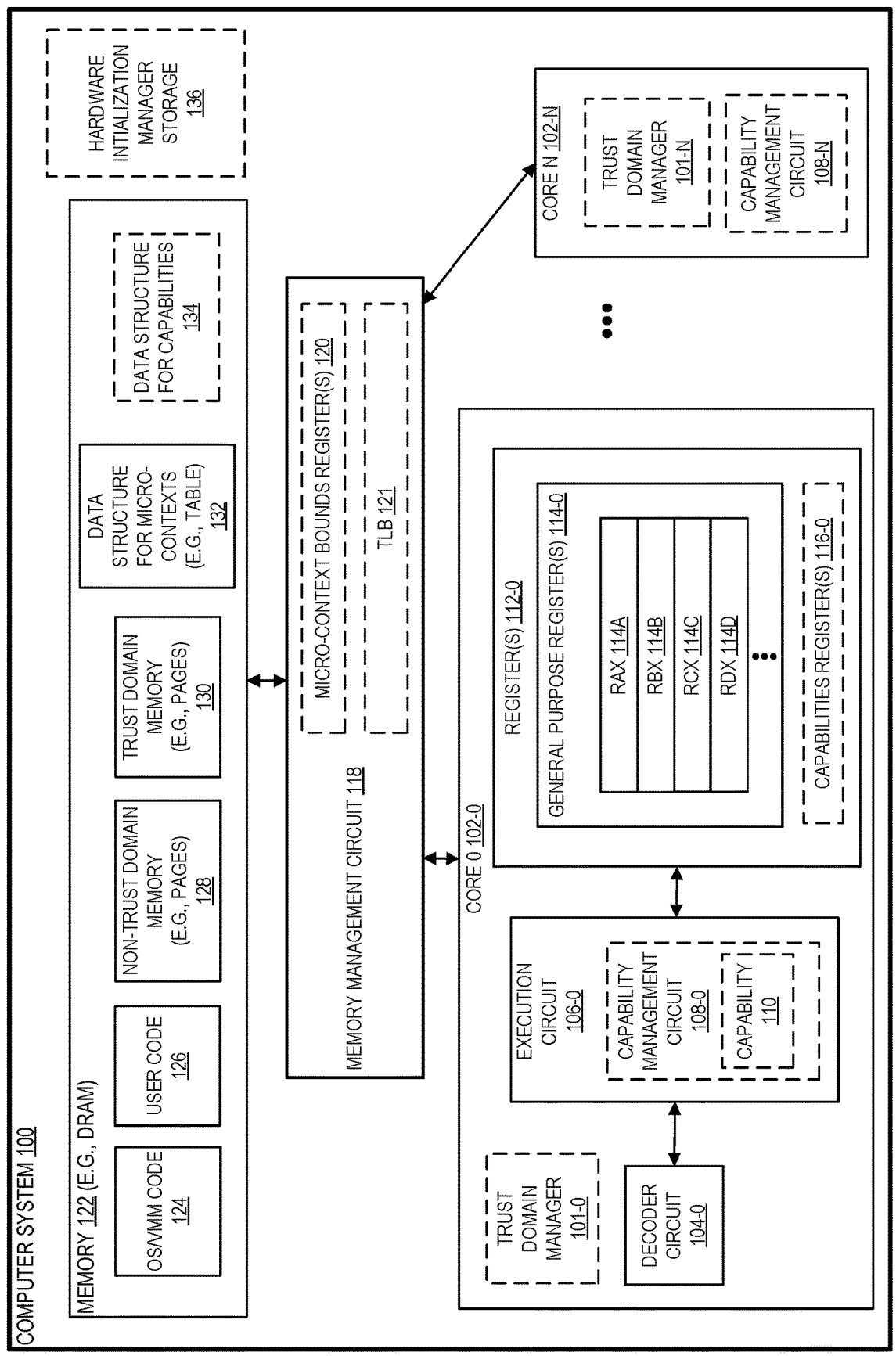
FIG. 1 illustrates a block diagram of a computer system including a plurality of cores having a trust domain manager, a memory, a memory management circuit, and storage for a data structure for micro-contexts according to examples of the disclosure.

In the following description, numerous specific details are set forth. However, it is understood that examples of the disclosure may be practiced without these specific details. In other instances, well-known circuits, structures, and techniques have not been shown in detail in order not to obscure the understanding of this description.

References in the specification to "one example," "an example," "examples," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. Certain operations include accessing one or more memory locations, e.g., to store and/or read (e.g., load) data. A system may include a plurality of cores, e.g., with a proper subset of cores in each socket of a plurality of sockets, e.g., of a system-on-a-chip (SoC). Each core (e.g., each processor or each socket) may access data storage (e.g., a memory). Memory may include volatile memory (e.g., dynamic random-access memory (DRAM)) or (e.g., byte-addressable) persistent (e.g., non-volatile) memory (e.g., non-volatile RAM) (e.g., separate from any system storage, such as, but not limited, separate from a hard disk drive). One example of persistent memory is a dual in-line memory module (DIMM) (e.g., a non-volatile DIMM) (e.g., an Intel® Optane™ memory), for example, accessible according to a Peripheral Component Interconnect Express (PCIe) standard.

In certain examples of computing, a virtual machine (VM) (e.g., guest) is an emulation of a computer system. In certain examples, VMs are based on a specific computer architecture and provide the functionality of an underlying physical computer system. Their implementations may involve specialized hardware, firmware, software, or a combination. In certain examples, a virtual machine monitor (VMM) (also known as a hypervisor) is a software program that, when executed, enables the creation, management, and governance of VM instances and manages the operation of a virtualized environment on top of a physical host machine. A VMM is the primary software behind virtualization environments and implementations in certain examples. When installed over a host machine (e.g., processor) in certain examples, a VMM facilitates the creation of VMs, e.g., each with separate operating systems (OS) and applications. The VMM may manage the backend operation of these VMs by allocating the necessary computing, memory, storage, and other input/output (IO) resources, such as, but not limited to, an input/output memory management unit (IOMMU) (e.g., an IOMMU circuit). The VMM may provide a centralized interface for managing the entire operation, status, and availability of VMs that are installed over a single host machine or spread across different and interconnected hosts.

It may be desirable to maintain the security (e.g., confidentiality) of information for a virtual machine from the VMM and/or other virtual machine(s). Certain processors (e.g., a system-on-a-chip (SoC) including a processor) utilize their hardware to isolate virtual machines, for example, with each referred to as a "trust domain". Certain processors support an instruction set architecture (ISA) (e.g., ISA extension) to implement trust domains. For example, Intel® trust domain extensions (Intel® TDX) that utilize architectural elements to deploy hardware-isolated virtual machines (VMs) referred to as trust domains (TDs).

In certain examples, a hardware processor (e.g., a trust domain manager thereof) and its ISA isolates TD VMs from the VMM (e.g., hypervisor) and/or other non-TD software (e.g., on the host platform). In certain examples, a hardware processor (e.g., a trust domain manager thereof) and its ISA implement trust domains to enhance confidential computing by helping protect the trust domains from a broad range of software attacks and reducing the trust domain's trusted computing base (TCB). In certain examples, a hardware processor (e.g., a trust domain manager thereof) and its ISA enhance a cloud tenant's control of data security and protection. In certain examples, a hardware processor (e.g., a trust domain manager thereof) and its ISA implement trust domains (e.g., trusted virtual machines) to enhance a cloud-service provider's (CSP) ability to provide managed cloud services without exposing tenant data to adversaries.

However, in certain examples, privileged system code (e.g., OS, VMM, and/or firmware) has access (e.g., to read and/or write) to memory that is storing data. This is a problem particularly where the data is to be kept private (e.g., the confidential information in memory for a trust domain) from the privileged (e.g., kernel/system level and/or not user level) system code. Certain examples herein (e.g., that implement trust domains) eliminate privileged software from the trusted compute base (TCB), e.g., the TCB of a TD, by utilizing a micro-context identifier that associates authenticated code with data (e.g., objects) they may access. In certain examples, these micro-context identifiers are maintained via hardware (e.g., only by a trust domain manager) with an ISA that prevents privileged software access (e.g., access to the data and/or micro-context identifiers). In certain examples herein, a micro-context identifier allows data (e.g., program code and/or program data) objects to be protected from both other peer software compartments as well as privileged system code. Certain examples herein utilize additional in-memory structure(s) to maintain data (e.g., code and its data) separation. In certain examples, a micro-context (e.g., supplied by a trust domain manager) is (i) not a hardware context, e.g., where a hardware context is the architectural state of the hardware components of a processor (e.g., core), and/or (ii) is not solely a mapping context.

In certain examples, the use of a micro-context disclosed herein is an improvement to the functioning of a SoC (e.g., processor) (e.g., of a computer) itself as it allows for the SoC (e.g., processor) to prevent data in a protected memory having a micro-context identification value from being accessed by code based on the code having a different micro-context identification value.

Additionally, certain examples herein utilize memory corruption detection (MCD) hardware and/or methods, for example, to prevent an out-of-bound access or an access with a dangling pointer. In certain examples, memory accesses are via a capability, e.g., instead of a pointer. In certain examples, the capability is a communicable (e.g., unforgeable) token of authority, e.g., through which programs access all memory and services within an address space. In certain examples, capabilities are a fundamental hardware type that are held in registers (e.g., where they can be inspected, manipulated, and dereferenced using capability instructions) or in memory (e.g., where their integrity is protected). In certain examples, the capability is a value that references an object along with an associated set of one or more access rights. In certain examples, a (e.g., user level) program on a capability-based operating system (OS) is to use a capability (e.g., provided to the program by the OS) to access a capability protected object.

In certain examples of a capability-based addressing scheme, (e.g., code and/or data) pointers are replaced by protected objects (e.g., "capabilities") that are created only through the use of privileged instructions, for example, which are executed only by either the kernel of the OS or some other privileged process authorized to do so, e.g., effectively allowing the kernel (e.g., supervisor level) to control which processes may access which objects in memory (e.g., without the need to use separate address spaces and therefore requiring a micro-context switch for an access). Certain examples implement a capability-based addressing scheme by extending the data storage (for example, extending memory (e.g., and register) addressing) with an additional bit (e.g., writable only if permitted by the capability management circuit) that indicates that a particular location is a capability, for example, such that all memory accesses (e.g., loads, stores, and/or instruction fetches) must be authorized by a respective capability or be denied. Example formats of capabilities are discussed below in reference to FIGS. 4A and 4B.

In certain examples, capability types of machines (e.g., processors) provide object and function granular protection for memory safety (e.g., type safety, compartmentalization, and/or object bounds). However, in certain examples, the capability-based addressing scheme does not eliminate privileged software (e.g., the OS and/or VMM) from modifying and/or accessing capability protected data, for example, fine-grain (e.g., subpage) capability protected data (e.g., objects).

Certain examples herein (e.g., that implement trust domains) eliminate privileged software from the trusted compute base (TCB), e.g., the TCB of a TD. Certain examples herein remove privileged software from the (e.g., fine-grain) protections offered by capability machines. In certain examples, additionally or alternatively to utilizing a capability (e.g., instead of a pointer), a processor utilizes a micro-context (e.g., a micro-context identification value) to implement micro-context based trust domains (e.g., micro-context based trusted execution environments). In certain examples, a processor implements capability-based trusted execution environments comprising a micro-context as disclosed herein. In certain examples, a micro-context is (i) not a hardware context, e.g., where a hardware context is the architectural state (e.g., the current page table structure(s) for a process) of the hardware components of a processor (e.g., core), and/or (ii) is not solely a mapping context. In certain examples, micro-contexts define new structures (e.g., separate from a page table itself) which validate that the page table mappings are correct (e.g., as expected by the trust domain manager) and/or micro-context IDs that are finer granularity of a page (e.g., object and/or function level). In certain examples, a micro-context is the isolation and protection of a sub-process at the object and/or function granularity.

In certain examples, using a capability (e.g., instead of a pointer) to unlock individual data objects allows for memory safety against bugs and same privilege level adversaries, but does not protect against privileged system code which fundamentally controls the capabilities (e.g., can assign a capability, turn on and off, access memory, etc.). Examples herein create a capability machine that removes even privileged software from the TCB, e.g., allowing the highest level of security across all levels of the machine down to the finest granularity software and data components (e.g., objects).

Certain examples herein enable hardware to maintain protections of capabilities from software at all privilege levels (e.g., user privilege level, system privilege level, etc.) in a system. In certain examples herein, capabilities are extended with a micro-context identifier that associates authenticated code with data (e.g., objects) they may access. In certain examples, these micro-context identifiers are maintained (e.g., generated) via hardware (e.g., only by a trust domain manager) with an ISA that prevents privileged software access. In certain examples herein, a micro-context identifier allows data (e.g., program code and/or program data) objects to be protected from both other peer software compartments as well as privileged system code. Certain examples herein utilize additional in-memory structure(s) to maintain data (e.g., code and its data) (e.g., object) separation.

In certain examples, the use of a micro-context disclosed herein is an improvement to the functioning of a SoC (e.g., processor) (e.g., of a computer) itself as it allows for the SoC (e.g., processor) to prevent data in a protected memory having a micro-context identification value from being accessed by code based on the code having a different micro-context identification value. In certain examples, the use of a micro-context disclosed herein is an improvement to the functioning of a SoC (e.g., processor) (e.g., of a computer) itself as it allows for the SoC (e.g., processor) to prevent data in a protected memory having a micro-context identification value from being accessed by privileged system code, for example, because the micro-context identification value is not readable by the privileged system code (e.g., even where the privileged system code is providing the memory used to store the data and/or micro-context identification value).

It should be understood that the functionality herein may be added to other confidential computing technology, for example, to AMD® Secure Encrypted Virtualization (e.g., SEV/SEV-ES/SEV-SNP), Intel® Trusted Execution Technology, or ARM® Realm Management Extension (RME), and thus allowing the TCB to be ideally reduced from an entire Virtual Machine and entire memory pages to individual data objects and software functions of finer granularities.

Turning now to FIG. 1, an example system architecture is depicted. FIG. 1 illustrates a block diagram of a computer system 100 including a plurality of cores 102-0 to 102-N (e.g., where N is any positive integer greater than one, although single core examples may also be utilized) having a trust domain manager (e.g., a single trust domain manager or distributed trust domain managers 101-0 to 101-N in each core, respectively), a memory 122, a memory management circuit 118, and storage for a data structure for micro-contexts according to examples of the disclosure.

In certain examples, each core includes (e.g., or logical includes) a set of registers, e.g., registers 112-0 for core 102-0, registers for core 102-N, etc. Registers 112 may be data registers and/or control registers, e.g., for each core (e.g., or each logical core of a plurality of logical cores of a physical core).

In certain examples, a (e.g., each) hardware processor core (e.g., core 102-0) includes a (i) hardware decoder circuit 104-0 to decode an instruction, e.g., an instruction that is to request access to a block (or blocks) of memory storing a capability (e.g., or a pointer) and/or an instruction that is to request access to a block (or blocks) of memory 122 through a capability 110 (e.g., or a pointer) to the block (or blocks) of the memory 122, and/or (ii) a hardware execution circuit 106-0 to execute the decoded instruction, e.g., an instruction that is to request access to a block (or blocks) of memory storing a capability (e.g., or a pointer) and/or an instruction that is to request access to a block (or blocks) of memory 122 through a capability 110 (e.g., or a pointer) to the block (or blocks) of the memory 122.

In certain examples, capability management circuit 108 (e.g., capability management circuit 108-0 for core 102-0 and/or capability management circuit 108-N for core 102-N) is to, in response to receiving an instruction that is requested for (e.g., fetch and) decode and/or execution, check if the instruction is a capability instruction or a non-capability instruction (e.g., a capability-unaware instruction), for example, and (i) if a capability instruction, is to allow access to memory 122 storing data and/or instructions (e.g., an object) protected by a capability, and/or (ii) if a non-capability instruction, is not to allow access to memory 122 storing data and/or instructions (e.g., an object) protected by a capability. In certain examples, capability management circuit 108 is to check if an instruction is a capability instruction or a non-capability instruction by checking (i) a field (e.g., opcode) of the instruction (e.g., checking a corresponding bit or bits of the field that indicate if that instruction is a capability instruction or a non-capability instruction) and/or (ii) if a particular register is a "capability" type of register (e.g., instead of a general-purpose data register) (e.g., implying that certain register(s) are not to be used to store a capability or capabilities). In certain examples, capability management circuit 108 is to manage the capabilities, e.g., only the capability management circuit is to set and/or clear validity tags. In certain examples, capability management circuit 108 is to clear the validity tag of a capability in a register in response to that register being written to by a non-capability instruction.

In certain examples, capability management circuit 108 is to enforce security properties on changes to capability data (e.g., metadata), for example, for the execution of a single instruction, by enforcing: (i) provenance validity that ensures that valid capabilities can only be constructed by instructions that do so explicitly (e.g., not by byte manipulation) from other valid capabilities (e.g., with this property applying to capabilities in registers and in memory), (ii) capability monotonicity that ensures, when any instruction constructs a new capability (e.g., except in sealed capability manipulation and exception raising), it cannot exceed the permissions and bounds of the capability from which it was derived, and/or (iii) reachable capability monotonicity that ensures, in any execution of arbitrary code, until execution is yielded to another domain, the set of reachable capabilities (e.g., those accessible to the current program state via registers, memory, sealing, unsealing, and/or constructing sub-capabilities) cannot increase.

In certain examples, capability management circuit 108 (e.g., at boot time) provides initial capabilities to the firmware, allowing data access and instruction fetch across the full address space. Additionally, all tags are cleared in memory in certain examples. Further capabilities can then be derived (e.g., in accordance with the monotonicity property) as they are passed from firmware to boot loader, from boot loader to hypervisor, from hypervisor to the OS, and from the OS to the application. At each stage in the derivation chain, bounds and permissions may be restricted to further limit access. For example, the OS may assign capabilities for only a limited portion of the address space to the user software, preventing use of other portions of the address space. In certain examples, capabilities carry with them intentionality, e.g., when a process passes a capability as an argument to a system call, the OS kernel can use only that capability to ensure that it does not access other process memory that was not intended by the user process (e.g., even though the kernel may in fact have permission to access the entire address space through other capabilities it holds). In certain examples, this prevents "confused deputy" problems, e.g., in which a more privileged party uses an excess of privilege when acting on behalf of a less privileged party, performing operations that were not intended to be authorized. In certain examples, this prevents the kernel from overflowing the bounds on a user space buffer when a pointer to the buffer is passed as a system-call argument. In certain examples, these architectural properties of a capability management circuit 108 provide the foundation on which a capability-based OS, compiler, and runtime can implement a certain programming language (e.g., C and/or C++) with memory safety and compartmentalization.

In certain examples, the capability is stored in a single line of data. In certain examples, the capability is stored in multiple lines of data. For example, a block of memory may be lines 1 and 2 of data of the (e.g., physical) addressable memory of memory 122 (e.g., non-trust domain memory 128 (e.g., pages) and/or trust domain memory 130 (e.g., pages)) having an address to one (e.g., the first) line (e.g., line 1). Certain examples have a memory of a total size X, where X is any positive integer.

In certain examples, capabilities (e.g., one or more fields thereof) themselves are also stored in memory 122, for example, in data structure 134 (e.g., table) for capabilities. In certain examples, a (e.g., validity) tag is stored in data structure 134 for a capability to memory. In certain examples, tags (e.g., in data structure 134) are not accessible by non-capability (e.g., load and/or store) instructions. In certain examples, a (e.g., validity) tag is stored along with the capability stored in memory (e.g., in one contiguous block). Such memory structures may be moved to and/or from registers under the control of the processor (e.g., state machine) and/or software control flow.

Depicted hardware processor core 102-0 includes one or more registers 112-0, for example, general purpose (e.g., data) register(s) 114-0 (e.g., registers RAX 114A, RBX 114B, RCX 114C, RDX 114D, etc.) and/or (optional) (e.g., dedicated only for capabilities) capabilities register(s) 116-0 (e.g., registers CAX, CBX, CCX, CDX, etc.).

In certain examples, one or more of the cores 102 are coupled to memory 122 via a memory management circuit. In certain examples, memory management circuit 118 is to control access (e.g., by the execution circuit 106-0) to the (e.g., addressable memory of) memory 122.

In certain examples, memory 122 is a memory local to the hardware processor (e.g., system memory). Memory 122 may be DRAM. In certain examples, memory 122 is a memory separate from the hardware processor, for example, memory of a server. Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain examples herein.

Memory 122 contents may include operating system (OS) and/or virtual machine monitor code 124, user (e.g., program) code 126, non-trust domain memory 128 (e.g., pages), trust domain memory 130 (e.g., pages), data structure (e.g., table) for micro-contexts 132, data structure for capabilities 134, or any combination thereof. In certain examples of computing, a virtual machine (VM) is an emulation of a computer system. In certain examples, VMs are based on a specific computer architecture and provide the functionality of an underlying physical computer system. Their implementations may involve specialized hardware, firmware, software, or a combination. In certain examples, the virtual machine monitor (VMM) (also known as a hypervisor) is a software program that, when executed, enables the creation, management, and governance of VM instances and manages the operation of a virtualized environment on top of a physical host machine. A VMM is the primary software behind virtualization environments and implementations in certain examples. When installed over a host machine (e.g., processor) in certain examples, a VMM facilitates the creation of VMs, e.g., each with separate operating systems (OS) and applications. The VMM may manage the backend operation of these VMs by allocating the necessary computing, memory, storage, and other input/output (IO) resources, such as, but not limited to, an input/output memory management unit (IOMMU). The VMM may provide a centralized interface for managing the entire operation, status, and availability of VMs that are installed over a single host machine or spread across different and interconnected hosts. Similarly, an operating system may support multiple processes in separate address spaces defined by their respective paging structures to separate one process's memory pages from another process's memory pages.

In certain examples, the hardware initialization manager (non-transitory) storage 136 stores hardware initialization manager firmware (e.g., or software). In one example, the hardware initialization manager (non-transitory) storage 136 stores Basic Input/Output System (BIOS) firmware. In another example, the hardware initialization manager (non-transitory) storage 136 stores Unified Extensible Firmware Interface (UEFI) firmware. In certain examples (e.g., triggered by the power-on or reboot of a processor), computer system 100 (e.g., core 102-0) executes the hardware initialization manager firmware (e.g., or software) stored in hardware initialization manager (non-transitory) storage 136 to initialize the system 100 for operation, for example, to begin executing an operating system (OS) and/or initialize and test the (e.g., hardware) components of system 100.

In certain examples, a trusted execution environment (TEE) security manager (e.g., implemented by a trust domain manager 101) is to: provide interfaces to the VMM to assign memory, processor, and other resources to trust domains (e.g., trusted virtual machines), (ii) implements the security mechanisms and access controls (e.g., translation tables, etc.) to protect confidentiality and integrity of the trust domains (e.g., trusted virtual machines) data and execution state in the host from entities not in the trusted computing base of the trust domains (e.g., trusted virtual machines), (iii) uses a protocol to manage the security state of the trusted device interface (TDI) to be used by the trust domains (e.g., trusted virtual machines), (iv) establishing/managing IDE encryption keys for the host, and, if needed, scheduling key refreshes. TSM programs the IDE encryption keys into the host root ports and communicates with the DSM to configure integrity and data encryption (IDE) encryption keys in the device, (v) or any single or combination thereof. In certain examples, a TEE security manager (e.g., also) provides authentication and attestation services where code and data are measured, and the measurement is sent to a remote entity to prove the code and data is loaded and running in the TEE on an authenticated machine.

In certain examples, an endpoint's (e.g., code's) "measurement" describes the process of calculating the cryptographic hash value of a piece of firmware/software or configuration data and tying the cryptographic hash value with the endpoint identity through the use of digital signatures. This allows an authentication initiator to establish that the identity and measurement of the firmware/software or configuration running on the authenticated trusted execution environment endpoint.

In certain examples, to help enforce the security policies for the TDs, a new mode of a processor called Secure-Arbitration Mode (SEAM) is introduced to host a (e.g., manufacturer provided) digitally signed, but not necessarily encrypted, security-services module. In certain examples, a trust domain manager (TDM) 101 is hosted in a reserved, memory space identified by a SEAM-range register (SEAMRR). In certain examples, the processor only allows access to SEAM-memory range to software executing inside the SEAM-memory range, and all other software accesses and direct-memory access (DMA) from devices to this memory range are aborted. In certain examples, a SEAM module does not have any memory-access privileges to other protected, memory regions in the platform, including the System-Management Mode (SMM) memory or (e.g., Intel® Software Guard Extensions (SGX)) protected memory.

In certain examples, trust domain manager (e.g., trust domain manager 101-0 to 101-N) assigns a micro-context identifier that associates (e.g., authenticated) code with data (e.g., objects) they may access. In certain examples, these micro-context identifiers are maintained via hardware (e.g., a trust domain manager) with an ISA that prevents privileged software access (e.g., access to the data and/or micro-context identifiers). In certain examples herein, a micro-context identifier allows data (e.g., program code and/or program data) objects (e.g., within trust domain memory 130) to be protected from both other peer software compartments as well as privileged system code (e.g., OS and/or VMM code 124). Certain examples herein utilize a data structure for micro-contexts 132 to maintain data (e.g., code and its corresponding data) separation in memory 122. In certain examples, a micro-context (e.g., supplied by a trust domain manager) is (i) not a hardware context, e.g., where a hardware context is the architectural state of the hardware components of a processor (e.g., core) and/or (ii) is not solely a mapping context.

In certain examples, a code section (e.g., a function to be provided by the OS and/or VMM for use by a trust domain) is measured (e.g., as discussed herein) by a trusted hardware component (e.g., Intel® Converged Security and Management Engine (CSME) embedded processor or special processor mode such as, but not limited to, microcode, XuCode, system management mode, and/or Security Arbitration Mode (SEAM)). In certain examples, these code sections are then assigned a micro-context identifier (Micro-context ID) and/or a virtual (e.g., linear) mapping associated with the physical memory location in which they reside. In certain examples, the data structure (e.g., table) for micro-contexts 132 is sequestered from (e.g., main) memory 122 (e.g., is not accessible (e.g., writable) by OS/VMM code 124 and/or other privileged code) (e.g., is only writable by trust domain manager(s) and/or readable by memory management circuit 118). In certain examples, the data structure (e.g., table) for micro-contexts 132 includes a micro-context identifier (e.g., identification (ID) value) for every proper subset (e.g., granule) of (e.g., addressable) physical memory, for example, a granule can be a plurality of bytes (e.g., 16 bytes or 32 bytes) of memory (e.g., where each page of memory (e.g., 4096 byte page) includes a plurality of granules and/or where a granule is less than an entire block of memory for a trust domain and the associated micro-context for that granule is 32 bits or 31 bits wide). In certain examples, a micro-context ID with a certain value (e.g., zero or other special value) indicates that the memory is shared (e.g., shared by a trust domain and privileged system code) and/or not-assigned. In certain examples, a micro-context ID with certain (e.g., other) values indicates that the memory is privately owned by the associated code micro-context (e.g., a code micro-context for a particular function). Thus, in certain examples, any attempt to jump into or otherwise execute code and/or to load/store data from another micro-context (or unassigned micro-context) is prevented by the hardware (e.g., by memory management circuit 118). In certain examples, a request to access a proper subset (e.g., granule) of memory having a first micro-context ID by code having a different micro-context ID is denied, e.g., the memory management circuit 118 causes a fault or otherwise. In certain examples, memory management circuit 118 is coupled to (e.g., or includes) one or more micro-context bounds registers 120 to indicate the (e.g., upper and/or lower) bounds of the data structure (e.g., table) for micro-contexts 132. In certain examples, the one or more micro-context bounds registers 120 is only writable by a trust domain manager. In certain examples, memory is effectively tagged with this the micro-context ID for every proper subset (e.g., granule) of memory.

In certain examples, a trust domain manager 101 is to cause a store of each micro-context identification value in a data structure 132 that includes a virtual (e.g., linear) address to physical address mapping for each of the plurality of granules of the memory (e.g., constituting a page of memory), e.g., the physical memory of a protected memory (e.g., trust domain memory 130 and/or non-trust domain memory 128). In certain examples, the memory management circuit 118 is to prevent data in the protected memory (e.g., trust domain memory 130 and/or non-trust domain memory 128) having a first virtual address from being accessed by code having a different virtual address in its virtual address to physical address mapping in the data structure 132. In certain examples, the physical memory (e.g., of memory 122) comprises a plurality of pages, and the data structure 132 comprises a micro-context identification value for each granule of the plurality of granules of each page of the physical memory and a virtual address to physical address mapping for each page. In certain examples, the granule is less than a single page of the physical memory. In certain examples, privileged system code includes an operating system and/or a virtual machine monitor 124 of the one or more hardware isolated virtual machines that are to execute on the hardware processor core (e.g., any of core 102-0 to 102-N). In certain examples, in response to a request from the privileged system code to provide a function to a trust domain to execute, the trust domain manager 101 is to store the function in the protected memory (e.g., trust domain memory 130 and/or non-trust domain memory 128), measure the code and/or data and assign each granule of memory that is utilized to store the function a (e.g., same) unique micro-context identification value that may then be associated with the measurement. In certain examples, in response to a request from the privileged system code to store data into the protected memory (e.g., trust domain memory 130 and/or non-trust domain memory 128), the trust domain manager 101 is to overwrite any assigned micro-context identification values with a micro-context identification value for code that is currently executing.

In certain examples, privileged system code (e.g., OS and/or VMM code 124) is to provide (e.g., allocate) memory to the trust domain manager 101 for use by a trust domain to insert code and/or data. By utilizing a micro-context ID value in certain of these examples, the privileged system code is then prevented from accessing the memory with that micro-context ID value as it does not have that micro-context ID that was provided separately by the trust domain manager 101. In certain examples, the privileged system code is allowed to access the memory with a certain memory having a micro-context ID when the privileged system code (e.g., OS) is provided that micro-context ID, e.g., by the trust domain manager. In certain examples, the privileged system code (e.g., OS and/or VMM) is provided its own micro-context ID. In certain example, the privileged system code (e.g., OS and/or VMM) is provided a micro-context ID that is also assigned to one or more particular trust domains. In certain examples, the privileged system code (e.g., OS and/or VMM) is allowed to reclaim memory that has a micro-context ID, e.g., but in doing so the memory is to be erased (e.g., cleared of its contents such that the previous contents cannot be accessed) and/or the associated micro-context ID will be removed (e.g., overwritten) (e.g., by a trust domain manager) in the data structure for micro-contexts 132. Some embodiments may revoke the reclaimed micro-context ID such that it may not be reused.

In certain examples, a request from code to access a virtual address of memory 122 causes a check (e.g., by memory management circuit) if the virtual address (e.g., the virtual address for the stored code that is requested to be executed) matches the virtual address from the data structure for micro-contexts 132. In certain examples, the virtual address of the request is used as an input to determine a physical address corresponding to that virtual address (e.g., from a mapping, such as, but not limited to, a virtual address to physical address mapping stored in a translation lookaside buffer (TLB) 121 populated by walking a page table structure located by a control register, e.g., CR3) and the physical address (e.g., from the TLB) is used to lookup the virtual address in the data structure for micro-contexts 132 that corresponds to that physical address (e.g., granule), for example, if the virtual address maps to physical granule 3 at 308 in FIG. 3, checking if the virtual address for the request matches the virtual address 312 in the data structure for micro-contexts 132, e.g., and if no, taking a corrective action (e.g., reporting an error and/or denying execution of that request), and if yes, checking if the current micro-context identification value (e.g., for the currently executing code) matches the micro-context identification value for the memory 122 target from the data structure for micro-contexts 132. In certain examples, the micro-context identification value in the data structure for micro-contexts 132 is determined by taking a virtual address of the request (e.g., the virtual address of the target) and looking up a corresponding entry (or entries) in the data structure for micro-contexts 132 that indicates the micro-context identification value, for example, by determining a physical address corresponding to that virtual address (e.g., from a mapping, such as, but not limited to, a virtual address to physical address mapping stored in a translation lookaside buffer (TLB)) and using the physical address to lookup the entry in the data structure for micro-contexts 132 that corresponds to that physical address (e.g., granule) and reading the micro-context ID for that physical address (e.g., granule) from the entry, and checking if the virtual address for the load/store (e.g., the virtual address of the target) matches the virtual address from the entry in the data structure for micro-contexts 132 that corresponds to that physical address (e.g., if the entry point is granule 3 at 308 in FIG. 3, checking if the virtual address for the function matches the virtual address 312), e.g., and if no, blocking execution of that load/store, and if yes, executing that load/store operation.

In certain examples, a translation lookaside buffer (e.g., TLB 121) converts a virtual address to a physical address (e.g., of the system memory). A TLB may include a data structure (e.g., table) to store (e.g., recently used) virtual-to-physical memory address translations, e.g., such that the translation does not have to be performed on each virtual address present to obtain the physical memory address. If the virtual address entry is not in the TLB, a processor may perform a page walk to determine the virtual-to-physical memory address translation.

In certain examples, the access to memory that is protected by a micro-context ID as discussed herein is also protected by a capability, e.g., capability management circuit 108.

Figure 2:
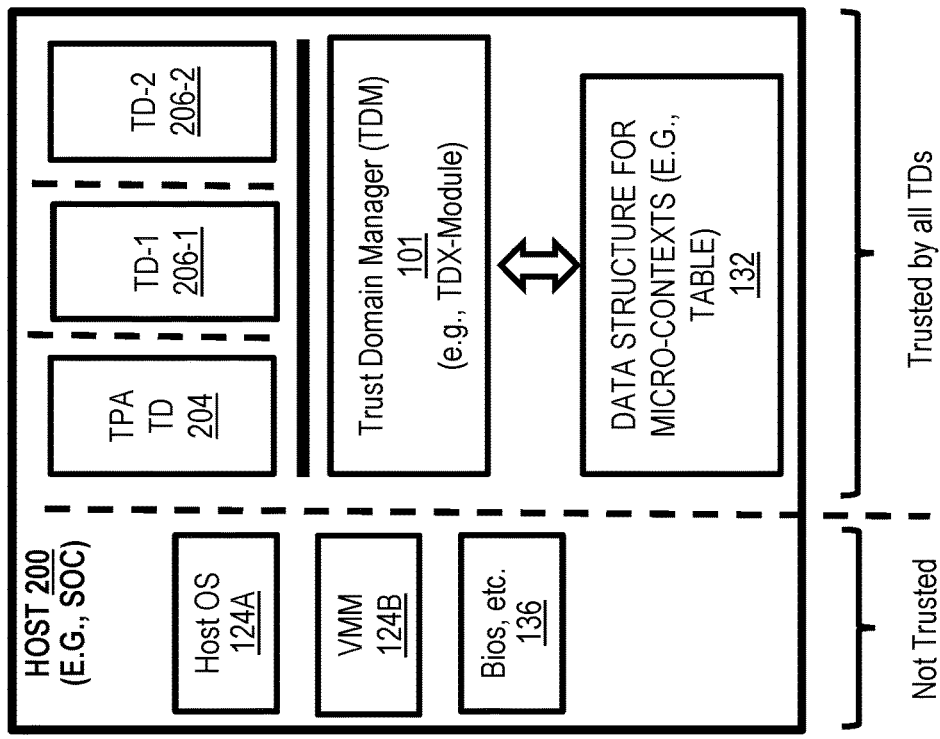
FIG. 2 illustrates a block diagram of a host including a trust domain manager and storage for a data structure for micro-contexts according to examples of the disclosure.

FIG. 2 illustrates a block diagram of a host (e.g., an instance of computer system 100 in FIG. 1) including a trust domain manager 101 and storage for a data structure for micro-contexts 132 according to examples of the disclosure. In certain examples, host 200 implements TDX-IO provisioning agent (TPA) 204 of trust domains, and a plurality of trust domains, shown as trust domain "1" 206-1 and trust domain "2" 206-2, although any single or plurality of trust domains may be implemented. In certain examples, host 200 includes a trust domain manager 101 to manage the trust domains (for example, with the vertical dashed lines indicating isolation therebetween the trust domains, e.g., and host OS 124A, VMM 124B, and BIOS 136, etc.). In certain examples, the virtual machine monitor 124B manages (e.g., generates) one or more virtual machines, e.g., with the trust domain manager 101 isolating a first virtual machine as a first trust domain from a second (or more) virtual machine and second (or more) trust domain(s).

In certain examples, a trust domain has both a private memory (e.g., in trust domain memory 130 in FIG. 1) and a shared memory (e.g., in non-trust domain memory 128 and/or trust domain memory 130 in FIG. 1). In certain examples, trust domain manager 101 accesses data structure for micro-contexts 132 to assign (e.g., and/or clear) a micro-context identifier that associates (e.g., authenticated) code with data (e.g., objects) that code having that micro-context ID is allowed to access.

Figure 3:
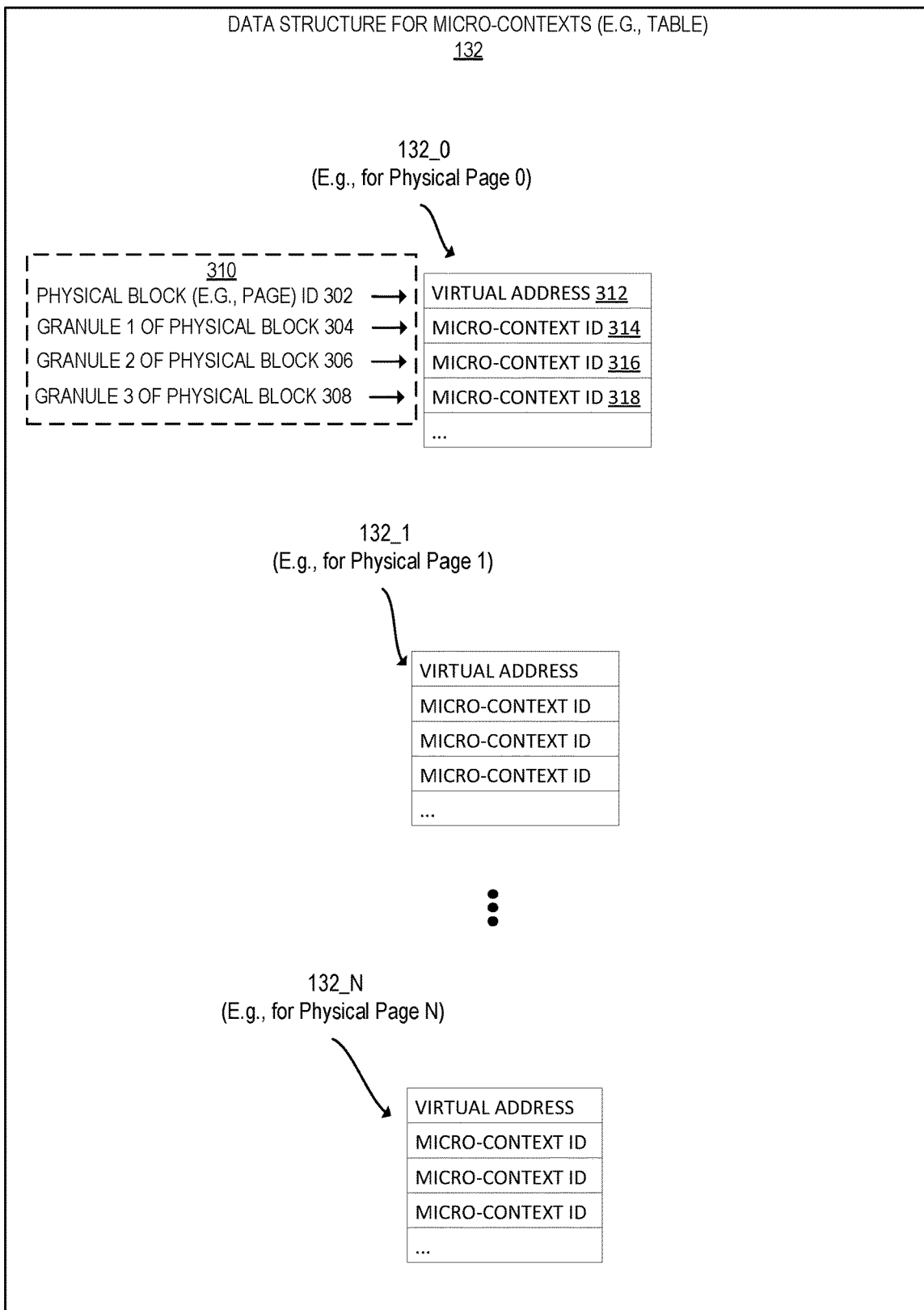
FIG. 3 illustrates a data structure for micro-contexts according to examples of the disclosure.

FIG. 3 illustrates a data structure for micro-contexts 132 according to examples of the disclosure. Although data structure 132 is discussed in reference to a paged memory (for example, a multiple paged memory, e.g., a 4-level paging or 5-level paging), it should be understood that the disclosure herein may be utilized in non-paged memory. In FIG. 3, a corresponding set of entries 132_0, 132_1, to 132_N (where N is any positive integer greater than 1) is provided for each physical block (e.g., page) of physical memory. In certain examples, there is a single set of entries for each physical block (e.g., page) of physical memory, e.g., set 132_0 for a first page "0", set 132_2 for a second page "1", etc.

In certain examples, each set 132 includes a virtual address mapped to a certain physical address for a page of memory, for example, with (i) virtual address 312 (for example, an entire virtual address for a granule or a proper subset of virtual addresses for that physical page, e.g., where the proper subset does not include the last set of bits (e.g., does not include the last 12 bits as one example for a 4096 byte sized page) for physical block (e.g., page) ID 302 and storage for a micro-context ID value for each proper subset (e.g., granule) of that block of memory. In certain examples, a single page can thus have different micro-context IDs for different proper subsets (e.g., granules) of that page, for example, with micro-context ID 314 for a first granule 304 (e.g., 16 bytes) of that block (e.g., page), micro-context ID 316 for a second granule 306 (e.g., 16 bytes) of that block (e.g., page), micro-context ID 318 for a third granule 308 (e.g., 16 bytes) of that block (e.g., page), etc. In certain examples, the data structure 132 is populated and/or accessed (e.g., only) by a trust domain manager (e.g., and the trusted hardware). In certain examples, a single set of entries in the data structure 132 for a single page starts with (e.g., a single entry for) the virtual (e.g., linear) address to physical address mapping for the page and the Micro-context ID for every granule of memory within that page.

As an example use, where data (e.g., program code and its data) is to be provided to a trust domain, the trust domain manager is to assign a particular micro-context ID value to that data and update the micro-context ID fields for the physical memory storing that data, e.g., if that data is 32 bytes, in one example, it is assigned to granule 1 304 and granule 2 306 in memory and that micro-context ID value is stored into the corresponding storage at 314 and 316.

As noted above, in certain examples, the access to memory that is protected by a micro-context ID as discussed herein is also protected by a capability, e.g., capability management circuit 108.

A capability may have different formats and/or fields. In certain examples, a capability is more than twice the width of a native (e.g., integer) pointer type of the baseline architecture, for example, 129-bit capabilities on 64-bit platforms, and 65-bit capabilities on 32-bit platforms. In certain examples, each capability includes an (e.g., integer) address of the natural size for the architecture (e.g., 32 or 64 bit) and also additional metadata (e.g., that is compressed in order to fit) in the remaining (e.g., 32 or 64) bits of the capability. In certain examples, each capability includes (or is associated with) a (e.g., 1-bit) validity "tag" whose value is maintained in registers and memory by the architecture (e.g., by capability management circuit 108). In certain examples, each element of the capability contributes to the protection model and is enforced by hardware (e.g., capability management circuit 108).

In certain examples, when stored in memory, valid capabilities are to be naturally aligned (e.g., at 64-bit or 128-bit boundaries) depending on capability size where that is the granularity at which in-memory tags are maintained. In certain examples, partial or complete overwrites with data, rather than a complete overwrite with a valid capability, lead to the in-memory tag being cleared, preventing corrupted capabilities from later being dereferenced. In certain examples, capability compression reduces the memory footprint of capabilities, e.g., such that the full capability, including address, permissions, and bounds fits within a certain width (e.g., 128 bits plus a 1-bit out-of-band tag). In certain examples, capability compression takes advantage of redundancy between the address and the bounds, which occurs where a pointer typically falls within (or close to) its associated allocation. In certain examples, the compression scheme uses a floating-point representation, allowing high-precision bounds for small objects, but uses stronger alignment and padding for larger allocations.

Figure 4A:
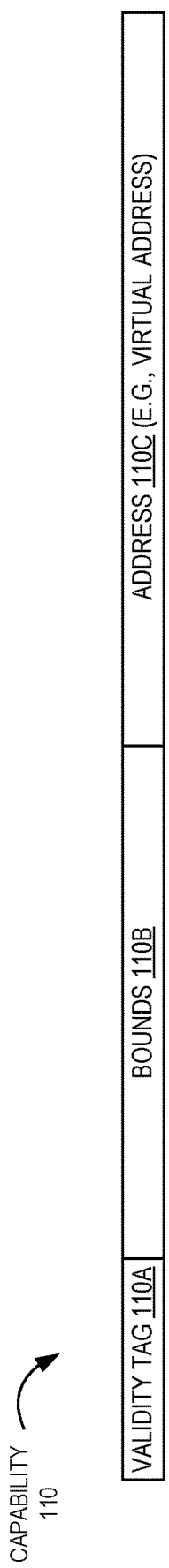
FIG. 4A illustrates an example format of a capability including a validity tag field, a bounds field, and an address field according to examples of the disclosure.

FIG. 4A illustrates an example format of a capability 110 including a validity tag 110A field, a bounds 110B field, and an address 110C (e.g., virtual address) field according to examples of the disclosure.

In certain examples, the format of a capability 110 includes one or any combination of the following. A validity tag 110A where the tag tracks the validity of a capability, e.g., if invalid, the capability cannot be used for load, store, instruction fetch, or other operations. In certain examples, it is still possible to extract fields from an invalid capability, including its address. In certain examples, capability-aware instructions maintain the tag (e.g., if desired) as capabilities are loaded and stored, and as capability fields are accessed, manipulated, and used. A bounds 110B that identifies the lower bound and/or upper bound of the portion of the address space to which the capability authorizes access (e.g., loads, stores, instruction fetches, or other operations). An address 110C (e.g., virtual address) for the address of the capability protected data (e.g., object).

In certain examples, the validity tag 110A provides integrity protection, the bounds 110B limits how the value can be used (e.g., for memory access), and/or the address 110C is the memory address storing the corresponding data (or instructions) protected by the capability.

Figure 4B:
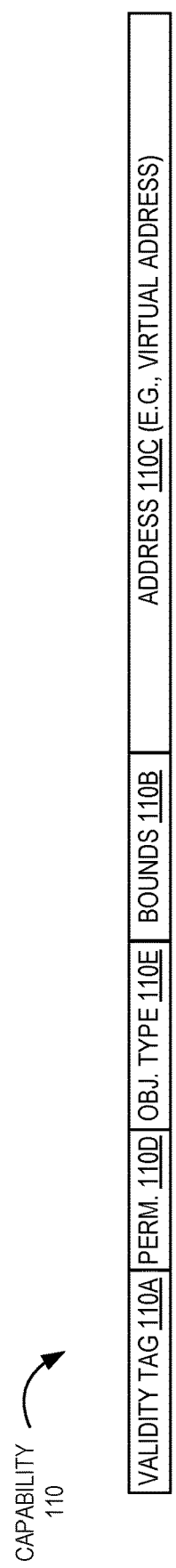
FIG. 4B illustrates an example format of a capability including a validity tag field, a permission field, an object type field, a bounds field, and an address field according to examples of the disclosure.

FIG. 4B illustrates an example format of a capability 110 including a validity tag 110A field, a permission(s) 110D field, an object type 110E field, a bounds 110B field, and an address 110C field according to examples of the disclosure.

In certain examples, the format of a capability 110 includes one or any combination of the following. A validity tag 110A where the tag tracks the validity of a capability, e.g., if invalid, the capability cannot be used for load, store, instruction fetch, or other operations. In certain examples, it is still possible to extract fields from an invalid capability, including its address. In certain examples, capability-aware instructions maintain the tag (e.g., if desired) as capabilities are loaded and stored, and as capability fields are accessed, manipulated, and used. A bounds 110B that identifies the lower bound and/or upper bound of the portion of the address space to which the capability authorizes access (e.g., loads, stores, instruction fetches, or other operations). An address 110C (e.g., virtual address) for the address of the capability protected data (e.g., object). Permissions 110D include a value (e.g., mask) that controls how the capability can be used, e.g., by restricting loading and storing of data and/or capabilities or by prohibiting instruction fetch. An object type 110E that identifies the object, for example (e.g., in a (e.g., C++) programming language that supports a "struct" as a composite data type (or record) declaration that defines a physically grouped list of variables under one name in a block of memory, allowing the different variables to be accessed via a single pointer or by the struct declared name which returns the same address), a first object type may be used for a struct of people's names and a second object type may be used for a struct of their physical mailing addresses (e.g., as used in an employee directory). In certain examples, if the object type 110E is not equal to a certain value (e.g., −1), the capability is "sealed" (with this object type) and cannot be modified or dereferenced. Sealed capa-bilities can be used to implement opaque pointer types, e.g., such that controlled non-monotonicity can be used to support fine-grained, in-address-space compartmentalization.

In certain examples, permissions 110D include one or more of the following: "Load" to allow a load from memory protected by the capability, "Store" to allow a store to memory protected by the capability, "Execute" to allow execution of instructions protected by the capability, "LoadCap" to load a valid capability from memory into a register, "StoreCap" to store a valid capability from a register into memory, "Seal" to seal an unsealed capability, "Unseal" to unseal a sealed capability, "System" to access system registers and instructions, "BranchSealedPair" to use in an unsealing branch, "CompartmentID" to use as a compartment ID, "MutableLoad" to load a (e.g., capability) register with mutable permissions, and/or "User[N]" for software defined permissions (where N is any positive integer greater than zero).

In certain examples, the validity tag 110A provides integrity protection, the permission(s) 110D limits the operations that can be performed on the corresponding data (or instructions) protected by the capability, the bounds 110B limits how the value can be used (e.g., for example, for memory access), the object type 110E supports higher-level software encapsulation, and/or the address 110C is the memory address storing the corresponding data (or instructions) protected by the capability.

In certain examples, a capability (e.g., value) includes one or any combination of the following fields: address value (e.g., 64 bits), bounds (e.g., 87 bits), flags (e.g., 8 bits), object type (e.g., 15 bits), permissions (e.g., 16 bits), tag (e.g., 1 bit), global (e.g., 1 bit), and/or executive (e.g., 1 bit). In certain examples, the flags and the lower 56 bits of the "capability bounds" share encoding with the "capability value".

Figure 5:
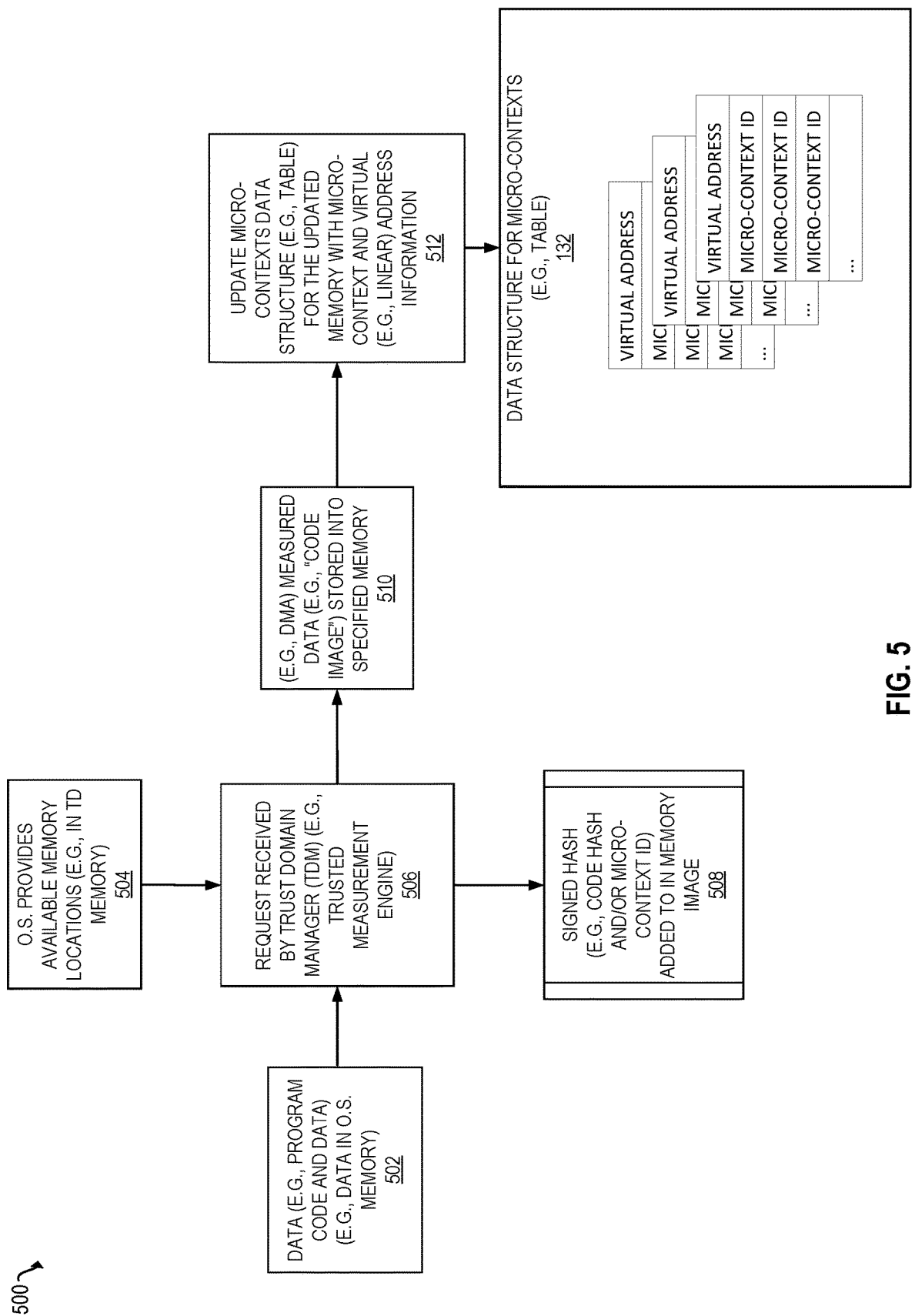
FIG. 5 is a flow diagram illustrating operations of a method for storing data by a trust domain manager into memory and performing a corresponding update of a data structure for micro-contexts according to examples of the disclosure.

Turning again to a discussion of micro-context ID values, FIG. 5 is a flow diagram illustrating operations 500 of a method for storing data (e.g., program code and/or program data) by a trust domain manager into memory and performing a corresponding update of a data structure for micro-contexts according to examples of the disclosure. Some or all of the operations 500 (or other processes described herein, or variations, and/or combinations thereof) are performed under the control of a trust domain manager (or other components discussed herein) as implemented herein and/or one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 500 are performed by trust domain manager 101 of the other figures.

The operations 500 include, at block 502, having data (e.g., program code and data) stored in memory (e.g., memory that is not trusted by a trust domain). For example, where the privileged system code (e.g., O.S.) has a function (e.g., "function as a service") in its memory but is to provide that function to a trust domain so the trust domain can execute the function in its memory space (e.g., where the privileged system code is not trusted). The operations 500 further include, at block 504, receiving a request at a trust domain manger (e.g., a trusted measurement engine thereof)

to provide the data (e.g., function) at 502 to a trust domain. The operations 500 further include, at block 506, privileged system code (e.g., OS) providing available memory locations (e.g., in TD memory) for the data (e.g., function) to be stored into. The operations 500 further include, at block 508, performing a signed hash (e.g., code/data hash and/or micro-context ID, timestamp, etc.) and adding it to the in memory image of the data. The operations 500 further include, at block 510, storing the (e.g., direct memory access (DMA)) measured data (e.g., signature from TDM) (e.g., "code image") into the specified memory (e.g., the memory provided at 504 may be allocated by the operating system or other privileged software). The operations 500 further include, at block 512, updating the data structure for micro-contexts 132 for the updated memory with the micro-context value for those parts (e.g., granule(s)) of memory and the virtual address (e.g., mapping) information.

Figure 6:
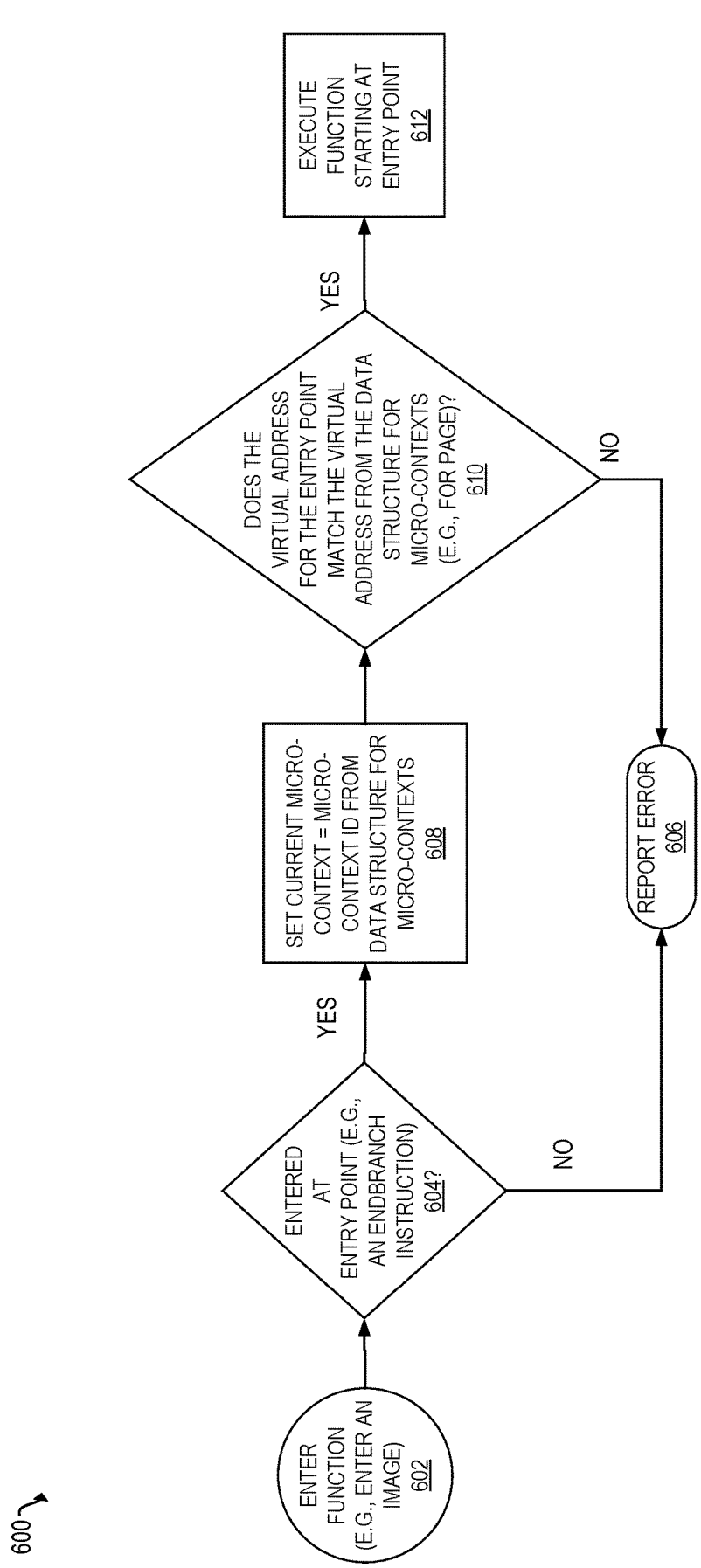
FIG. 6 is a flow diagram illustrating operations of a method for entering code (e.g., a function) protected by a trust domain manager having a data structure for micro-contexts according to examples of the disclosure.

FIG. 6 is a flow diagram illustrating operations 600 of a method for entering executable code (e.g., a function) protected by a trust domain manager having a data structure for micro-contexts according to examples of the disclosure. Some or all of the operations 600 (or other processes described herein, or variations, and/or combinations thereof) are performed under the control of a trust domain manager (or other components discussed herein) (for example, where the memory contents have been configured by the trust domain manager, but the operations are performed by the trusted hardware, e.g. the processor, as part of the execution of a program) as implemented herein and/or one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 600 are configured by trust domain manager 101 of the other figures, and performed by the (e.g., trusted hardware of the) processor as part of the execution of a program.

The operations 600 include, at block 602, entering a function (e.g., entering an "image" of code). The operations 600 further include, at block 604, checking if the code is entered at a known entry point (e.g., at a particular instruction, e.g., an end branch (EndBranch) instruction), and if no, reporting an error (e.g., and denying execution of that function) at block 606, and if yes, setting the current micro-context identification value (e.g., in a register of the processor) to the micro-context identification value for the function from the data structure for micro-contexts (e.g., data structure 132) at block 608. In certain examples, the micro-context identification value for the function is determined by taking a virtual address of the function (e.g., the virtual address of the entry point) and looking up a corresponding entry (or entries) in the data structure for micro-contexts (e.g., data structure 132) that indicates the micro-context identification value, for example, by determining a physical address corresponding to that virtual address (e.g., from a mapping, such as, but not limited to, a virtual address to physical address mapping stored in a translation lookaside buffer (TLB)) and using the physical address to lookup the entry in the data structure for micro-contexts (e.g., data structure 132) that corresponds to that physical address (e.g., granule) and reading the micro-context ID for that physical address (e.g., granule) from the entry. The operations 600 further include, at block 610, checking if the virtual address for the function (e.g., the virtual address of the entry point) matches the virtual address from the entry in the data structure for micro-contexts (e.g., data structure 132) that corresponds to that physical address (e.g., if the entry point is granule 3 at 308 in FIG. 3, checking if the virtual address for the function matches the virtual address 312), and if no, reporting an error (e.g., and denying execution of that function) at block 606, and if yes, executing that function at block 612 starting at the entry point with the new micro-context ID.

In certain examples, once initial code and data is loaded into its micro-context ID tagged memory locations, it may then be executed, e.g., by entering the code image at a special instruction (e.g., an EndBranch instruction). In certain examples, EndBranch instruction is a branch target instruction indicating points at which a code image expects to be entered in an expected control flow.

In certain examples, a system (e.g., processor) is to not allow the reassigning of a linear mapping (e.g., linear pages) without the trust domain manager being part of the process, e.g., such that it is updated with any changes of micro-context ID values.

In certain examples, once executing, code (e.g., a program) may assign additional memory granules to its micro-context ID by overwriting that memory granule. For example, a move direct (MOVDIR) processor instructions may be used to overwrite the memory while also updating the micro-context ID in the data structure for micro-contexts (e.g., data structure 132) for the overwritten memory (e.g., granule(s)) to match the micro-context ID of the code executing the instruction. In certain examples, this operation destroys any previous data at that memory location (e.g., only as allowed by page table permissions established by privileged software) that may have belonged to a previous micro-context ID and reassigns the memory to the storing micro-context ID. Thus, in certain examples, the act of code overwriting the memory granule causes the processor to reassign the micro-context ID for that memory granule.

Figure 7:
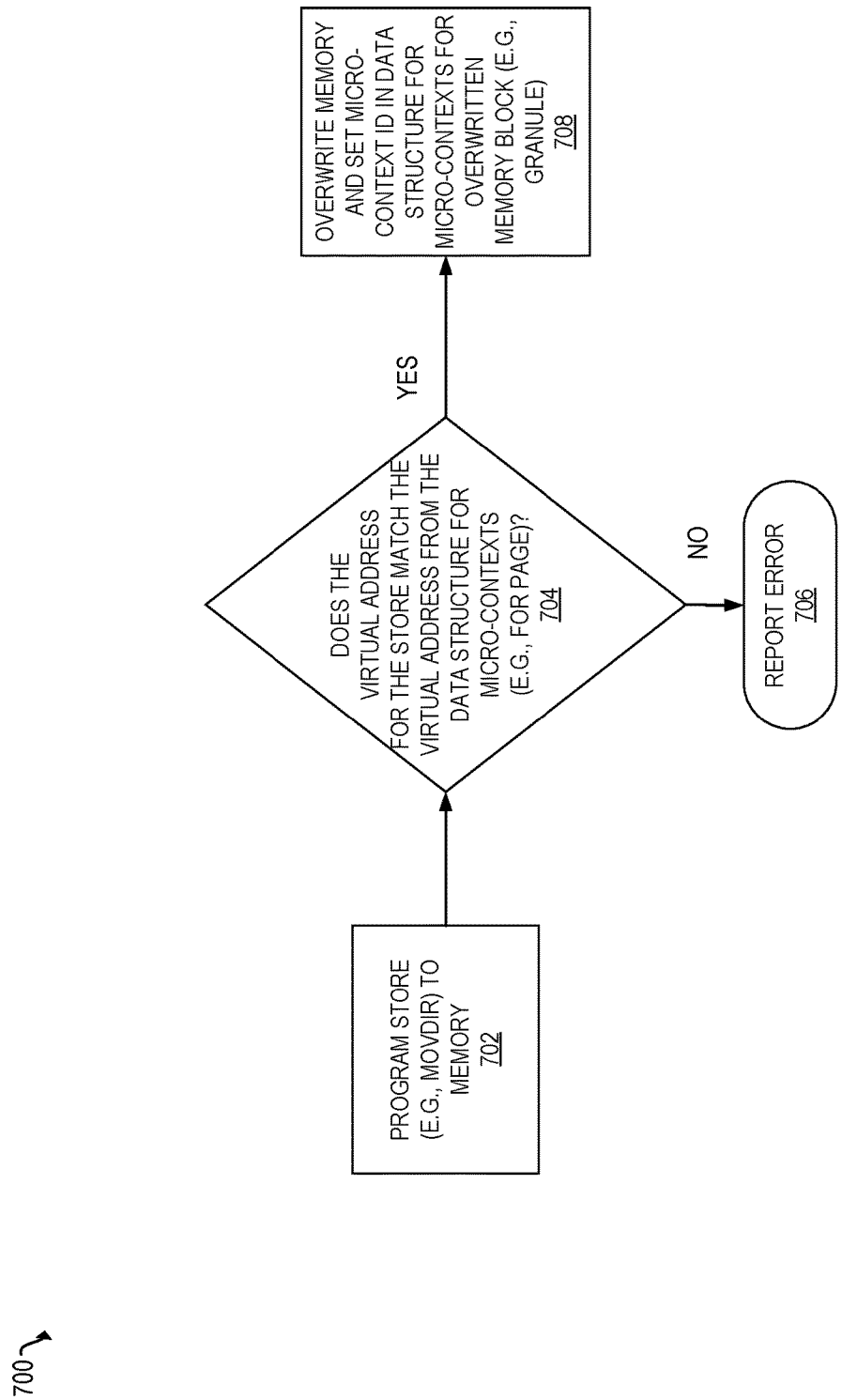
FIG. 7 is a flow diagram illustrating operations of a method for performing an overwrite store to memory protected by a trust domain manager having a data structure for micro-contexts according to examples of the disclosure.

FIG. 7 is a flow diagram illustrating operations 700 of a method for performing an overwrite store to memory protected by a trust domain manager having a data structure for micro-contexts according to examples of the disclosure. Some or all of the operations 700 (or other processes described herein, or variations, and/or combinations thereof) are configured under the control of a trust domain manager (or other components discussed herein) as implemented herein and/or one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 700 are performed by trust domain manager 101 of the other figures.

The operations 700 include, at block 702, receiving a request to perform a store (e.g., a program store to memory). In certain examples, the store request is via a MOVDIR instruction. The operations 700 further include, at block 704, checking if the virtual address for the store (e.g., the virtual address for the storage target indicated by an operand of the MOVDIR instruction) matches the virtual address from the data structure for micro-contexts. In certain examples, the virtual address of the store is used as an input to determine a physical address corresponding to that virtual address (e.g., from a mapping, such as, but not limited to, a virtual address to physical address mapping stored in a translation lookaside buffer (TLB)) and the physical address is used to lookup the virtual address in the data structure for micro-contexts (e.g., data structure 132) that corresponds to that physical address (e.g., granule), e.g., if the entry point is granule 3 at 308 in FIG. 3, checking if the virtual address for the program store matches the virtual address 312. In certain examples, if no at block 704, reporting an error (e.g., and denying the program store) at block 706, and if yes at block 704, overwriting that memory (e.g., one or more granules) and setting the corresponding micro-context ID value(s) for that memory in the data structure for micro-contexts (e.g., data structure 132) to the current micro-context ID value (e.g., for the currently executing code that requested the program store) at block 708.

In certain examples, when executing, code (e.g., a program) may access (e.g., load and/or store) memory granules or freely jump/execute to memory granules that share the same micro-context ID.

Figure 8:
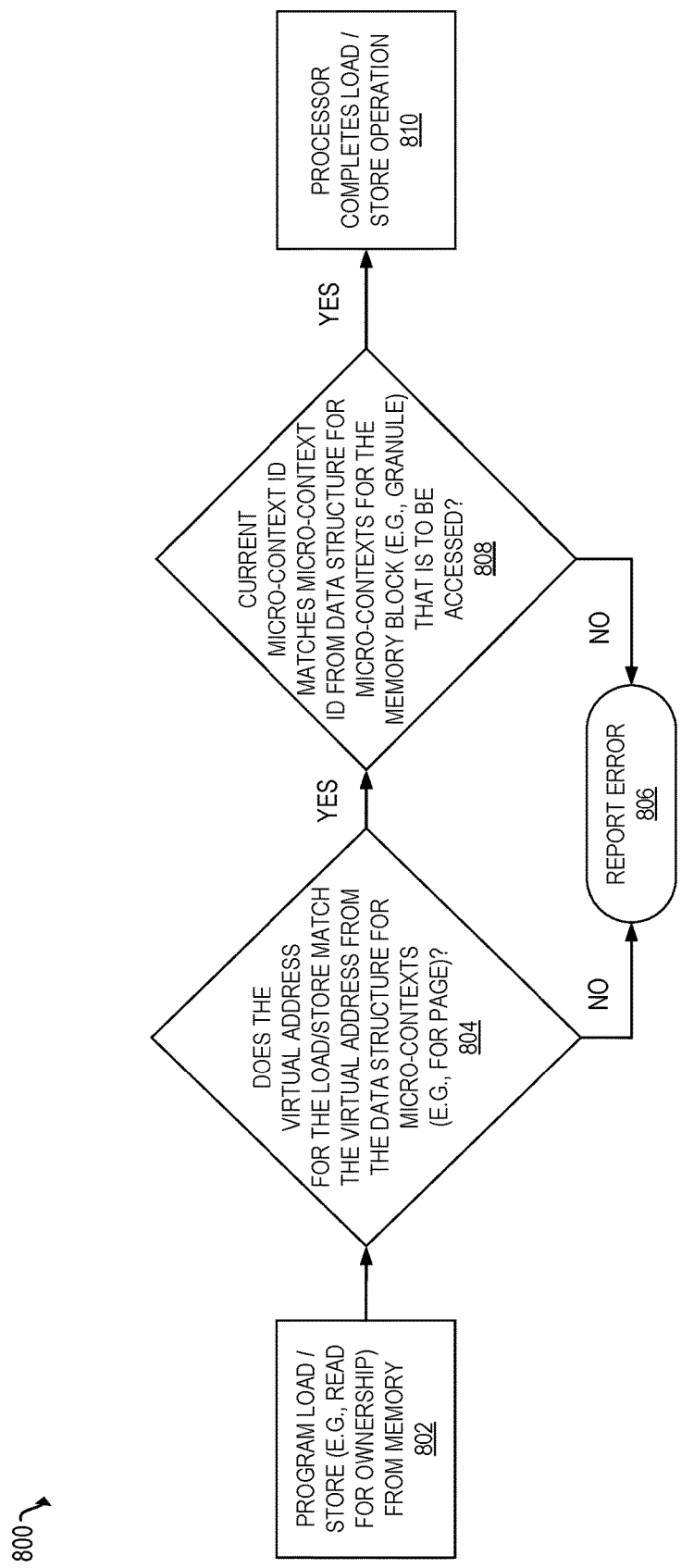
FIG. 8 is a flow diagram illustrating operations of a method for performing a load and/or store to memory protected by a trust domain manager having a data structure for micro-contexts according to examples of the disclosure.

FIG. 8 is a flow diagram illustrating operations 800 of a method for performing a load and/or store to memory protected by a trust domain manager having a data structure for micro-contexts according to examples of the disclosure. Some or all of the operations 800 (or other processes described herein, or variations, and/or combinations thereof) are configured under the control of a trust domain manager (or other components discussed herein) as implemented herein and/or one or more computer systems (e.g., processors) configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 800 are performed by trust domain manager 101 of the other figures.

The operations 800 include, at block 802, receiving a request to perform a program load/store (e.g., a read-for-ownership) for memory. The operations 800 further include, at block 804, checking if the virtual address for the load/store (e.g., the virtual address for the storage target indicated by an operand of the load/store request) matches the virtual address from the data structure for micro-contexts. In certain examples, the virtual address of the load/store is used as an input to determine a physical address corresponding to that virtual address (e.g., from a mapping, such as, but not limited to, a virtual address to physical address mapping stored in a translation lookaside buffer (TLB)) and the physical address is used to lookup the virtual address in the data structure for micro-contexts (e.g., data structure 132) that corresponds to that physical address (e.g., granule), e.g., if the entry point is granule 3 at 308 in FIG. 3, checking if the virtual address for the load/store matches the virtual address 312, and if no, reporting an error (e.g., and denying execution of that load/store) at block 806, and if yes, checking if the current micro-context identification value (e.g., for the currently executing code) matches the micro-context identification value for the memory target from the data structure for micro-contexts (e.g., data structure 132) at block 808. In certain examples, the micro-context identification value for the load/store is determined by taking a virtual address of the load/store (e.g., the virtual address of the target) and looking up a corresponding entry (or entries) in the data structure for micro-contexts (e.g., data structure 132) that indicates the micro-context identification value, for example, by determining a physical address corresponding to that virtual address (e.g., from a mapping, such as, but not limited to, a virtual address to physical address mapping stored in a translation lookaside buffer (TLB)) and using the physical address to lookup the entry in the data structure for micro-contexts (e.g., data structure 132) that corresponds to that physical address (e.g., granule) and reading the micro-context ID for that physical address (e.g., granule) from the entry, and checking if the virtual address for the load/store (e.g., the virtual address of the target) matches the virtual address from the entry in the data structure for micro-contexts (e.g., data structure 132) that corresponds to that physical address (e.g., if the entry point is granule 3 at 308 in FIG. 3, checking if the virtual address for the function matches the virtual address 312), and if no, reporting an error (e.g., and denying execution of that load/store) at block 806, and if yes, executing that load/store operation at block 810.

In certain examples, privileged system code reclaims memory by overwriting the memory locations in a similar way, where the privileged system code will use a micro-context ID for the privileged system code.

In certain examples, when a protected (e.g., trust domain) program is executing and an interrupt or other asynchronous event occurs, the processor state for the program (e.g., including the general purpose registers) must be protected as well. In certain examples, this is done by writing the processor state to a stack using direct writes that assure the stack granules are assigned to the same micro-context ID as the interrupted program. In certain examples, to resume the program, an internal interrupt handler with the same micro-context ID is executed so the program securely restores its internal state. In certain examples, the end of the stack is indicated by the processor with a special value that the handler will check before restoring state.

In this way, in certain examples, the processor enables private compartments that are inaccessible from one another and from privileged program code. To allow sharing of data, in certain examples, special pointers, addresses, and/or capabilities are used. In certain examples, special micro-context IDs are used to indicate that a granule of memory is to be shared across different micro-context IDs. To share data, in certain examples, a program will move (e.g., via MOVDIR) data using a pointer and/or address that indicates that the granule should instead use the shared micro-context ID. Similarly, when loading shared memory, in certain examples, the program will indicate in the pointer and/or address that the micro-context ID should be of the shared type. In this way, in certain examples, a program cannot be confused by private data replaced by shared data as the operation is always explicit and under the program's control.

In certain examples, to support privileged memory functions (such as, but not limited to, paging), it is desirable to include interactions with the trusted processor mode (or embedded processor) to provide cryptographic protections of the code/data and micro-context ID mappings that may be remapped in memory or moved to permanent storage. In certain examples, a page may only be accessed by the trusted hardware, encrypted and integrity protected (e.g., using a message authentication code (MAC)) using a secret key known only to the trust domain manager, replay protected with a version, linear address mapping taken into account (e.g., as a cryptographic tweak), and/or returned to the privileged software so that the contents may be securely paged out in this cryptographic form. Similarly, when paging back in, in certain examples, the privileged system code (e.g., OS) will provide the encrypted page contents to the trusted processor mode (or embedded processor) which will decrypt the contents, verify the MAC and version, write (e.g., DMA) the contents back to memory specified by the privileged system code specifying the appropriate virtual address in the data structure for micro-contexts (e.g., data structure 132) and updating the data structure for micro-contexts (e.g., data structure 132) with the appropriate micro-context IDs per granule for the page.

Figure 9:
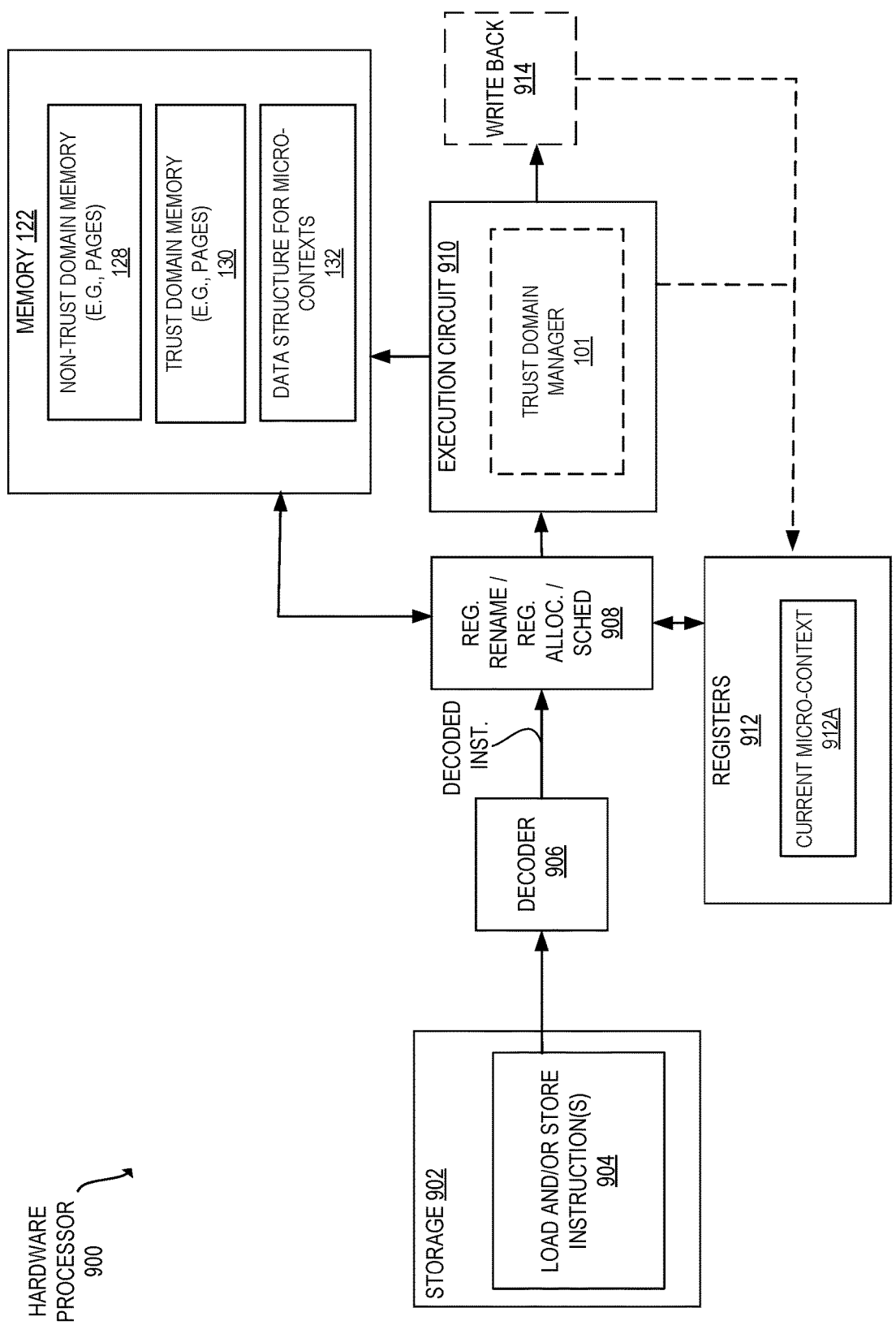
FIG. 9 illustrates a hardware processor coupled to storage that includes one or more load and/or store instructions according to examples of the disclosure.

FIG. 9 illustrates a hardware processor 900 coupled to storage 902 that includes one or more load and/or store instructions 904 according to examples of the disclosure. In certain examples, a load and/or store instruction is according to any of the disclosure herein. In certain examples, a load and/or store instruction includes an indication that a data structure for micro-contexts 132 is to be checked, e.g., before allowing access to the memory location for that load and/or store in memory.

In certain examples, e.g., in response to a request to perform a load and/or store operation, the instruction 904 (e.g., macro-instruction) is fetched from storage 902 and sent to decoder 906. In the depicted example, the decoder 906 (e.g., decoder circuit) decodes the instruction into a decoded instruction (e.g., one or more micro-instructions or micro-operations). The decoded instruction is then sent for execution, e.g., via scheduler circuit 908 to schedule the decoded instruction for execution.

In certain examples, (e.g., where the processor/core supports out-of-order (OoO) execution), the processor includes a register rename/allocator circuit 908 coupled to register file 912 (e.g., and memory 122) to allocate resources and perform register renaming on registers (e.g., registers associated with the initial sources and final destination of the instruction). In certain examples, (e.g., for out-of-order execution), the processor includes one or more scheduler circuits 908 coupled to the decoder 906. The scheduler circuit(s) may schedule one or more operations associated with decoded instructions, including one or more operations decoded from a load and/or store instruction 904, e.g., for execution on the execution circuit 910 (e.g., including a trust domain manger 101). Trust domain manager 101 may be within the execution circuit 910.

As one example, a decoded load and/or store instruction 904 is to cause the execution circuit 910 (e.g., or trust domain manager 101 and/or memory management circuit 118 in FIG. 1) to check if a virtual address for the load/store (e.g., the virtual address for the storage target indicated by an operand of the load/store request) matches the virtual address from the data structure for micro-contexts 132. In certain examples, the virtual address of the load/store is used as an input to determine a physical address corresponding to that virtual address (e.g., from a mapping, such as, but not limited to, a virtual address to physical address mapping stored in a translation lookaside buffer (TLB)) and the physical address is used to lookup the virtual address in the data structure for micro-contexts 132 that corresponds to that physical address (e.g., granule), e.g., if the entry point is granule 3 at 308 in FIG. 3, checking if the virtual address for the load/store matches the virtual address 312, and if no, reporting an error (e.g., and denying execution of that load/store), and if yes, checking if the current micro-context ID 912A (e.g., for the currently executing code) matches the micro-context identification value for the memory 122 (e.g., memory 128 and/or memory 130) target from the data structure for micro-contexts 132. In certain examples, the micro-context identification value for the load/store is determined by taking a virtual address of the load/store (e.g., the virtual address of the target) and looking up a corresponding entry (or entries) in the data structure for micro-contexts 132 that indicates the micro-context identification value, for example, by determining a physical address corresponding to that virtual address (e.g., from a mapping, such as, but not limited to, a virtual address to physical address mapping stored in a translation lookaside buffer (TLB)) and using the physical address to lookup the entry in the data structure for micro-contexts 132 that corresponds to that physical address (e.g., granule) and reading the micro-context ID for that physical address (e.g., granule) from the entry, and checking if the virtual address for the load/store (e.g., the virtual address of the target) matches the virtual address from the entry in the data structure for micro-contexts 132 that corresponds to that physical address (e.g., if the entry point is granule 3 at 308 in FIG. 3, checking if the virtual address for the function matches the virtual address 312), e.g., and if no, blocking execution of that load/store, and if yes, executing that load/store operation.

In certain examples, a write back circuit 914 is included to write back results of the instruction to a destination (e.g., write them to memory 122), for example, so those results are visible within a processor (e.g., visible outside of the execution circuit that produced those results).

One or more of these components (e.g., decoder 906, register rename/register allocator/scheduler 908, execution circuit 910, registers (e.g., register file) 912, memory 122, or write back circuit 914) may be in a single core of a hardware processor (e.g., and multiple cores each with an instance of these components).

Figure 10:
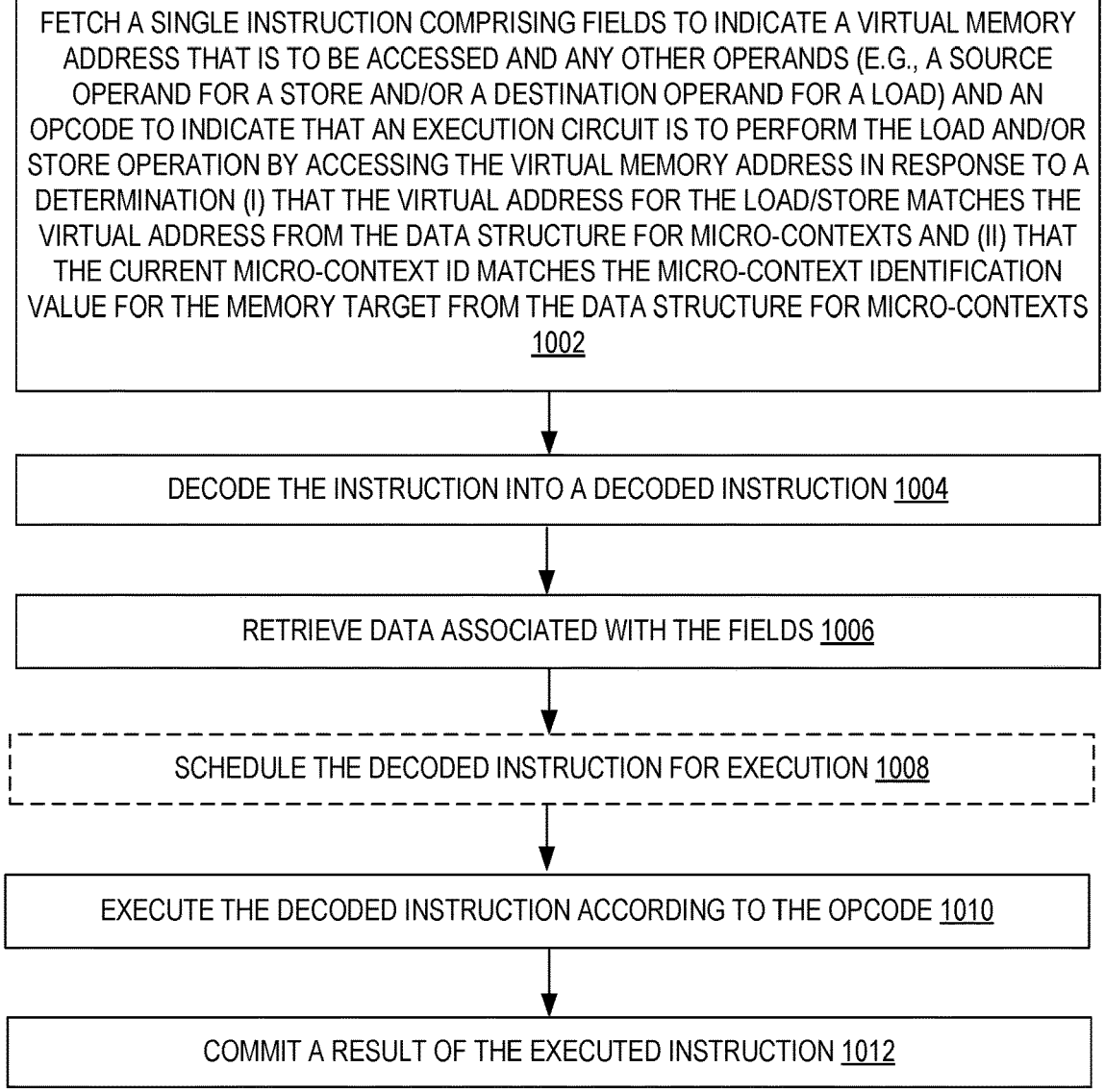
FIG. 10 illustrates a method of processing a load and/or store instruction according to examples of the disclosure.

FIG. 10 illustrates a method 1000 of processing a load and/or store instruction according to examples of the disclosure. In certain examples, a processor (e.g., or processor core) performs method 1000, e.g., in response to receiving a request to execute an instruction from software. Depicted method 1000 includes processing a single load and/or store instruction by: fetching the load and/or store instruction comprising fields to indicate a virtual memory address that is to be accessed and any other operands (e.g., a source operand for a store and/or a destination operand for a load), and an opcode to indicate that an execution circuit is to perform the load and/or store operation by accessing the virtual memory address in response to a determination (i) that the virtual address for the load/store matches the virtual address from the data structure for micro-contexts (e.g., as discussed herein) and/or (ii) that the current micro-context identification value (e.g., for the currently executing code) matches the micro-context identification value for the memory target from the data structure for micro-contexts 1002, decode the instruction into a decoded instruction at 1004, retrieve data associated with the fields at 1006, (optionally) schedule the decoded instruction for execution at 1008, execute the decoded instruction according to the opcode at 1010, and commit a result of the executed instruction at 1012.

FIG. 11 is a flow diagram illustrating operations 1100 of a method for allowing and preventing access to protected memory by a trust domain manager having a data structure for micro-contexts according to examples of the disclosure. Some or all of the operations 1100 (or other processes described herein, or variations, and/or combinations thereof) are performed under the control of a trust domain manager (or other components discussed herein) as implemented herein and/or one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 1100 are performed by trust domain manager 101 of the other figures.

The operations 1100 include, at block 1102, managing one or more hardware isolated virtual machines as a respective trust domain with a region of protected memory by a trust domain manager of a hardware processor core. The operations 1100 further include, at block 1104, assigning a micro-context identification value, that is not readable by privileged system code that is executing on the hardware processor core, to each granule of a plurality of granules of physical memory of the protected memory by the trust domain manager of the hardware processor core. The operations 1100 further include, at block 1106, allowing, by a memory management circuit coupled between the hardware processor core and the physical memory, a first memory access of data in the protected memory having a first micro-context identification value requested by a first code based on the first code having the first micro-context identification value. The operations 1100 further include, at block 1108, preventing, by the memory management circuit, a second memory access of the data in the protected memory having the first micro-context identification value requested by a second code based on the second code having a different micro-context identification value.

Exemplary architectures, systems, etc. that the above may be used in are detailed below. Exemplary instruction formats that may cause enqueuing of a job for an accelerator are detailed below.

At least some examples of the disclosed technologies can be described in view of the following examples:

Example 1

An apparatus comprising:
a hardware processor core to implement a trust domain manager to manage one or more hardware isolated virtual machines as a respective trust domain with a region of protected memory, and assign a micro-context identification value, that is not readable by privileged system code that is to execute on the hardware processor core, to each granule of a plurality of granules of physical memory of the protected memory; and
a memory management circuit coupled between the hardware processor core and the physical memory, wherein the memory management circuit is to prevent data in the protected memory having a first micro-context identification value from being accessed by code based on the code having a different micro-context identification value.

Example 2

The apparatus of example 1, wherein the trust domain manager is to store each micro-context identification value in a data structure that includes a virtual address to physical address mapping for each granule of the plurality of granules of the physical memory of the protected memory.

Example 3

The apparatus of example 2, wherein the memory management circuit is to prevent data in the protected memory having a first virtual address from being accessed by code having a different virtual address in its virtual address to physical address mapping in the data structure (e.g., even when the code has a same micro-context identification value as the micro-context identification value in the data structure for the physical address).

Example 4

The apparatus of example 2, wherein the physical memory comprises a plurality of pages, and the data structure comprises a micro-context identification value for each granule of the plurality of granules of each page of the physical memory and a virtual address to physical address mapping for each page.

Example 5

The apparatus of example 1, wherein the granule is less than a page of the physical memory.

Example 6

The apparatus of example 1, wherein the privileged system code includes an operating system and a virtual machine monitor of the one or more hardware isolated virtual machines that are to execute on the hardware processor core.

Example 7

The apparatus of example 1, wherein, in response to a request from the privileged system code to provide a function to a trust domain to execute, the trust domain manager is to store the function in the protected memory, and assign each granule of memory utilized to store the function a same micro-context identification value.

Example 8

The apparatus of example 1, wherein, in response to a request from the privileged system code to store data into the protected memory, the trust domain manager is to overwrite any assigned micro-context identification values with a micro-context identification value for code that is currently executing.

Example 9

A method comprising:
managing one or more hardware isolated virtual machines as a respective trust domain with a region of protected memory by a trust domain manager of a hardware processor core;
assigning a micro-context identification value, that is not readable by privileged system code that is executing on the hardware processor core, to each granule of a plurality of granules of physical memory of the protected memory by the trust domain manager of the hardware processor core;
allowing, by a memory management circuit coupled between the hardware processor core and the physical memory, a first memory access of data in the protected memory having a first micro-context identification value requested by a first code based on the first code having the first micro-context identification value; and preventing, by the memory management circuit, a second memory access of the data in the protected memory having the first micro-context identification value requested by a second code based on the second code having a different micro-context identification value.

Example 10

The method of example 9, further comprising storing, by the trust domain manager, each micro-context identification value in a data structure that includes a virtual address to physical address mapping for each granule of the plurality of granules of the physical memory of the protected memory.

Example 11

The method of example 10, further comprising preventing, by the memory management circuit, data in the protected memory having a first virtual address from being accessed by code having a different virtual address in its virtual address to physical address mapping in the data structure.

Example 12

The method of example 10, wherein the physical memory comprises a plurality of pages, and the data structure comprises a micro-context identification value for each granule of the plurality of granules of each page of the physical memory and a virtual address to physical address mapping for each page.

Example 13

The method of example 9, wherein the granule is less than a page of the physical memory.

Example 14

The method of example 9, wherein the privileged system code includes an operating system and a virtual machine monitor of the one or more hardware isolated virtual machines that are executing on the hardware processor core.

Example 15

The method of example 9, further comprising, in response to a request from the privileged system code to provide a function to a trust domain to execute:
storing the function in the protected memory, and
assigning each granule of memory utilized to store the function a same micro-context identification value by the trust domain manager.

Example 16

The method of example 9, further comprising, in response to a request from the privileged system code to store data into the protected memory:
overwriting, by the trust domain manager, any assigned micro-context identification values with a micro-context identification value for code that is currently executing.

Example 17

An apparatus comprising:
a physical memory;
a hardware processor core to implement a trust domain manager to manage one or more hardware isolated virtual machines as a respective trust domain with a region of protected memory, and assign a micro-context identification value, that is not readable by privileged system code that is to execute on the hardware processor core, to each granule of a plurality of granules of the physical memory of the protected memory; and
a memory management circuit coupled between the hardware processor core and the physical memory, wherein the memory management circuit is to prevent data in the protected memory having a first micro-context identification value from being accessed by code based on the code having a different micro-context identification value.

Example 18

The apparatus of example 17, wherein the trust domain manager is to store each micro-context identification value in a data structure that includes a virtual address to physical address mapping for each granule of the plurality of granules of the physical memory of the protected memory.

Example 19

The apparatus of example 18, wherein the memory management circuit is to prevent data in the protected memory having a first virtual address from being accessed by code having a different virtual address in its virtual address to physical address mapping in the data structure.

Example 20

The apparatus of example 18, wherein the physical memory comprises a plurality of pages, and the data structure comprises a micro-context identification value for each granule of the plurality of granules of each page of the physical memory and a virtual address to physical address mapping for each page.

Example 21

The apparatus of example 17, wherein the granule is less than a page of the physical memory.

Example 22

The apparatus of example 17, wherein the privileged system code includes an operating system and a virtual machine monitor of the one or more hardware isolated virtual machines that are to execute on the hardware processor core.

Example 23

The apparatus of example 17, wherein, in response to a request from the privileged system code to provide a function to a trust domain to execute, the trust domain manager is to store the function in the protected memory, and assign each granule of memory utilized to store the function a same micro-context identification value.

Example 24

The apparatus of example 17, wherein, in response to a request from the privileged system code to store data into the protected memory, the trust domain manager is to overwrite any assigned micro-context identification values with a micro-context identification value for code that is currently executing.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Examples of the instruction(s) described herein may be embodied in different formats. Additionally, exemplary systems, architectures, and pipelines are detailed below. Examples of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While examples are described in which both vector and scalar operations are supported through the vector friendly instruction format, alternative examples use only vector operations the vector friendly instruction format.

Figure 12A:
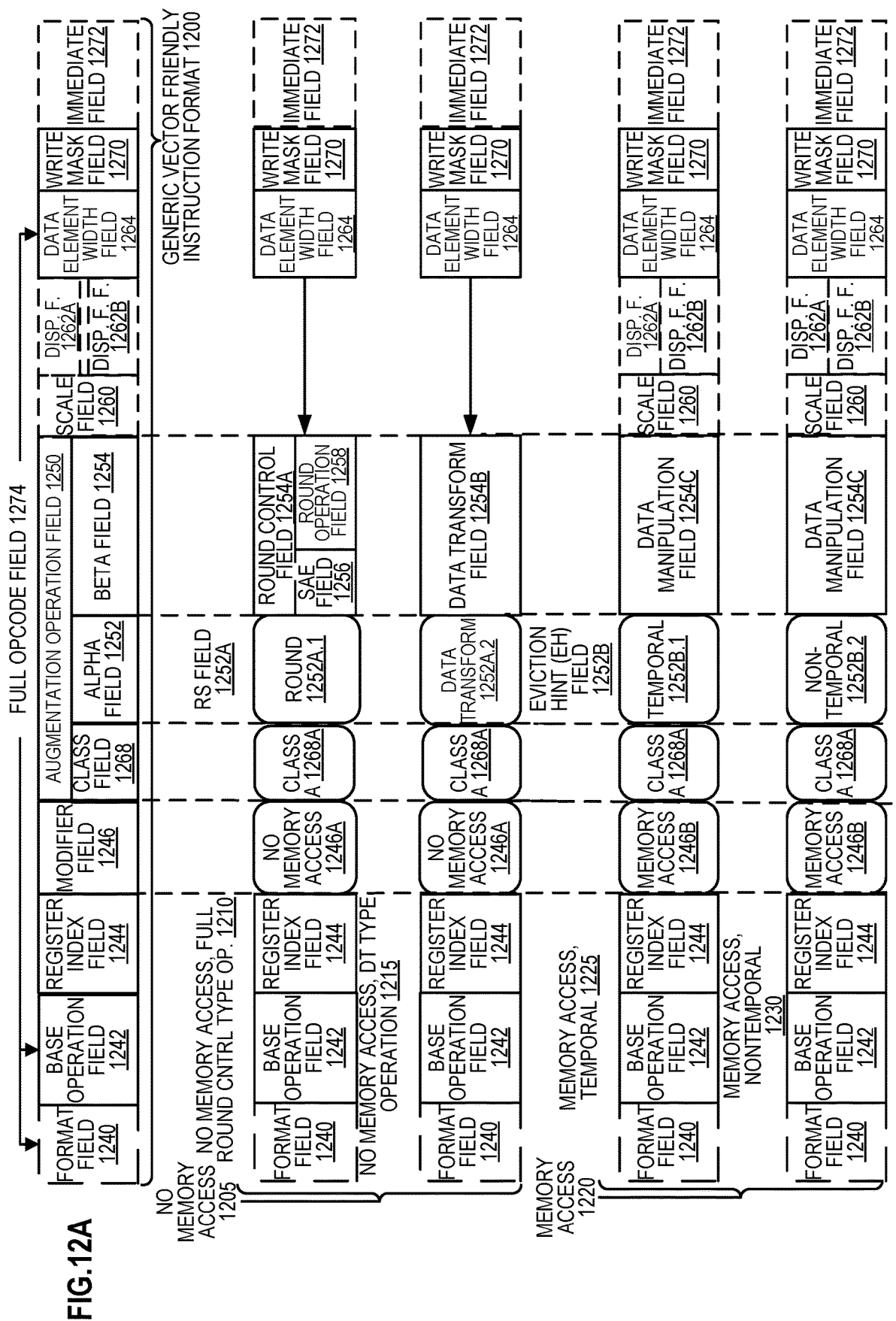
FIG. 12A is a block diagram illustrating a generic vector friendly instruction format and class A instruction templates thereof according to examples of the disclosure.
Figure 12B:
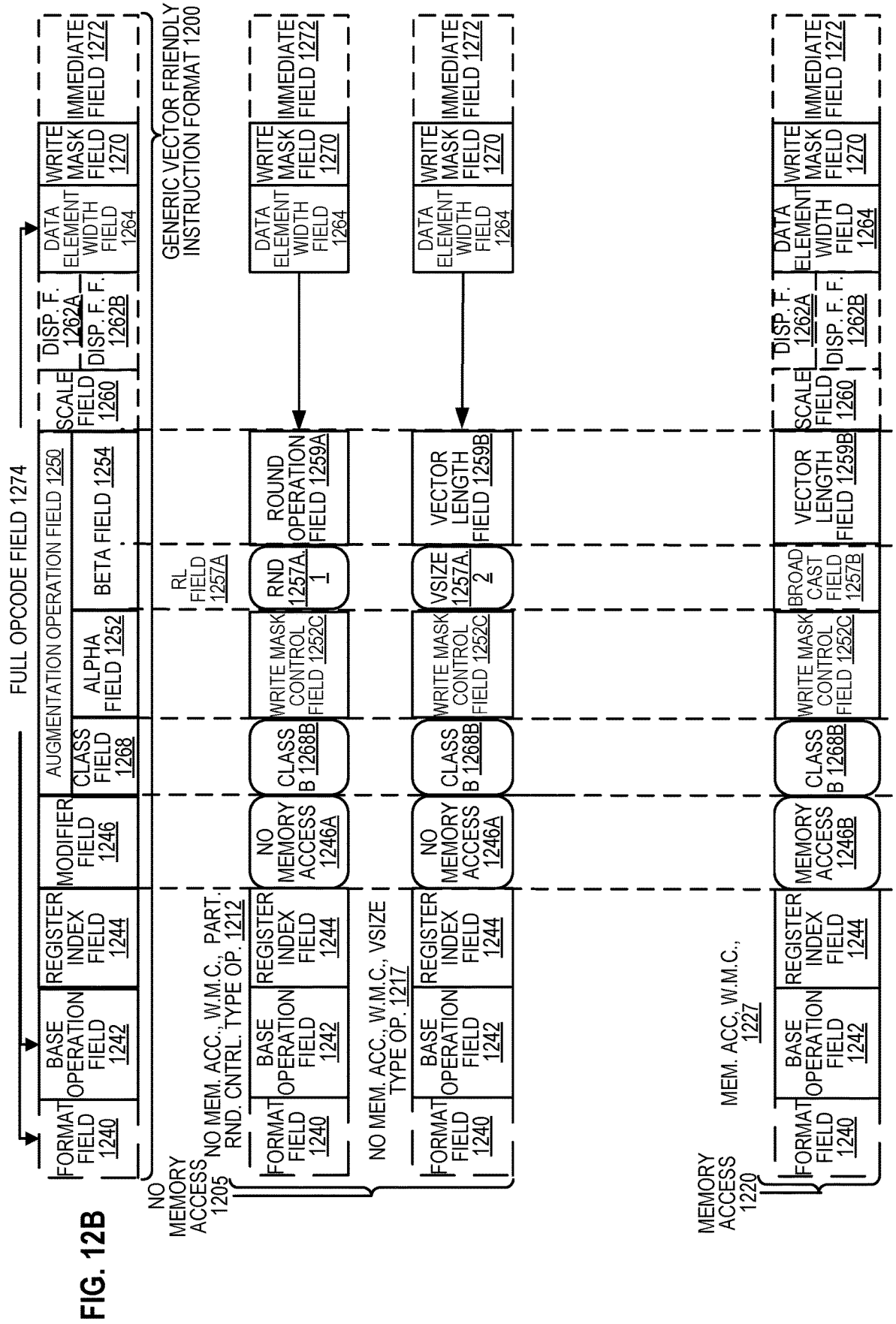
FIG. 12B is a block diagram illustrating the generic vector friendly instruction format and class B instruction templates thereof according to examples of the disclosure.

FIGS. 12A-12B are block diagrams illustrating a generic vector friendly instruction format and instruction templates thereof according to examples of the disclosure. FIG. 12A is a block diagram illustrating a generic vector friendly instruction format and class A instruction templates thereof according to examples of the disclosure; while FIG. 12B is a block diagram illustrating the generic vector friendly instruction format and class B instruction templates thereof according to examples of the disclosure. Specifically, a generic vector friendly instruction format 1200 for which are defined class A and class B instruction templates, both of which include no memory access 1205 instruction templates and memory access 1220 instruction templates. The term generic in the context of the vector friendly instruction format refers to the instruction format not being tied to any specific instruction set.

While examples of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative examples may support more, less and/or different vector operand sizes (e.g., 256 byte vector operands) with more, less, or different data element widths (e.g., 128 bit (16 byte) data element widths).

The class A instruction templates in FIG. 12A include: 1) within the no memory access 1205 instruction templates there is shown a no memory access, full round control type operation 1210 instruction template and a no memory access, data transform type operation 1215 instruction template; and 2) within the memory access 1220 instruction templates there is shown a memory access, temporal 1225 instruction template and a memory access, non-temporal 1230 instruction template. The class B instruction templates in FIG. 12B include: 1) within the no memory access 1205 instruction templates there is shown a no memory access, write mask control, partial round control type operation 1212 instruction template and a no memory access, write mask control, vsize type operation 1217 instruction template; and 2) within the memory access 1220 instruction templates there is shown a memory access, write mask control 1227 instruction template.

The generic vector friendly instruction format 1200 includes the following fields listed below in the order illustrated in FIGS. 12A-12B.

Format field 1240—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1242—its content distinguishes different base operations.

Register index field 1244—its content, directly or through address generation, specifies the locations of the source and destination operands, be they in registers or in memory. These include a sufficient number of bits to select N registers from a PxQ (e.g., 32×512, 16×128, 32×1024, 64×1024) register file. While in one example N may be up to three sources and one destination register, alternative examples may support more or less sources and destination registers (e.g., may support up to two sources where one of these sources also acts as the destination, may support up to three sources where one of these sources also acts as the destination, may support up to two sources and one destination).

Modifier field 1246—its content distinguishes occurrences of instructions in the generic vector instruction format that specify memory access from those that do not; that is, between no memory access 1205 instruction templates and memory access 1220 instruction templates. Memory access operations read and/or write to the memory hierarchy (in some cases specifying the source and/or destination addresses using values in registers), while non-memory access operations do not (e.g., the source and destinations are registers). While in one example this field also selects between three different ways to perform memory address calculations, alternative examples may support more, less, or different ways to perform memory address calculations.

Augmentation operation field 1250—its content distinguishes which one of a variety of different operations to be performed in addition to the base operation. This field is context specific. In one example of the disclosure, this field is divided into a class field 1268, an alpha field 1252, and a beta field 1254. The augmentation operation field 1250 allows common groups of operations to be performed in a single instruction rather than 2, 3, or 4 instructions.

Scale field 1260—its content allows for the scaling of the index field's content for memory address generation (e.g., for address generation that uses $2^{scale}*\text{index}+\text{base}$).

Displacement Field 1262A—its content is used as part of memory address generation (e.g., for address generation that uses $2^{scale}*\text{index}+\text{base}+\text{displacement}$).

Displacement Factor Field 1262B (note that the juxtaposition of displacement field 1262A directly over displacement factor field 1262B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1274 (described later herein) and the data manipulation field 1254C. The displacement field 1262A and the displacement factor field 1262B are optional in the sense that they are not used for the no memory access 1205 instruction templates and/or different examples may implement only one or none of the two.

Data element width field 1264—its content distinguishes which one of a number of data element widths is to be used (in some examples for all instructions; in other examples for only some of the instructions). This field is optional in the sense that it is not needed if only one data element width is supported and/or data element widths are supported using some aspect of the opcodes.

Write mask field 1270—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1270 allows for partial vector operations, including loads, stores, arithmetic, logical, etc. While examples of the disclosure are described in which the write mask field's 1270 content selects one of a number of write mask registers that contains the write mask to be used (and thus the write mask field's 1270 content indirectly identifies that masking to be performed), alternative examples instead or additional allow the mask write field's 1270 content to directly specify the masking to be performed.

Immediate field 1272—its content allows for the specification of an immediate. This field is optional in the sense that is it not present in an implementation of the generic vector friendly format that does not support immediate, and it is not present in instructions that do not use an immediate.

Class field 1268—its content distinguishes between different classes of instructions. With reference to FIGS. 12A-B, the contents of this field select between class A and class B instructions. In FIGS. 12A-B, rounded corner squares are used to indicate a specific value is present in a field (e.g., class A 1268A and class B 1268B for the class field 1268 respectively in FIGS. 12A-B).

Instruction Templates of Class A

In the case of the non-memory access 1205 instruction templates of class A, the alpha field 1252 is interpreted as an RS field 1252A, whose content distinguishes which one of the different augmentation operation types are to be performed (e.g., round 1252A.1 and data transform 1252A.2 are respectively specified for the no memory access, round type operation 1210 and the no memory access, data transform type operation 1215 instruction templates), while the beta field 1254 distinguishes which of the operations of the specified type is to be performed. In the no memory access 1205 instruction templates, the scale field 1260, the displacement field 1262A, and the displacement scale filed 1262B are not present.

No-Memory Access Instruction Templates—Full Round Control Type Operation

In the no memory access full round control type operation 1210 instruction template, the beta field 1254 is interpreted as a round control field 1254A, whose content(s) provide static rounding. While in the described examples of the disclosure the round control field 1254A includes a suppress all floating point exceptions (SAE) field 1256 and a round operation control field 1258, alternative examples may support may encode both these concepts into the same field or only have one or the other of these concepts/fields (e.g., may have only the round operation control field 1258).

SAE field 1256—its content distinguishes whether or not to disable the exception event reporting; when the SAE field's 1256 content indicates suppression is enabled, a given instruction does not report any kind of floating-point exception flag and does not raise any floating point exception handler.

Round operation control field 1258—its content distinguishes which one of a group of rounding operations to perform (e.g., Round-up, Round-down, Round-towards-zero and Round-to-nearest). Thus, the round operation control field 1258 allows for the changing of the rounding mode on a per instruction basis. In one example of the disclosure where a processor includes a control register for specifying rounding modes, the round operation control field's 1250 content overrides that register value.

No Memory Access Instruction Templates—Data Transform Type Operation

In the no memory access data transform type operation 1215 instruction template, the beta field 1254 is interpreted as a data transform field 1254B, whose content distinguishes which one of a number of data transforms is to be performed (e.g., no data transform, swizzle, broadcast).

In the case of a memory access 1220 instruction template of class A, the alpha field 1252 is interpreted as an eviction hint field 1252B, whose content distinguishes which one of the eviction hints is to be used (in FIG. 12A, temporal 1252B.1 and non-temporal 1252B.2 are respectively specified for the memory access, temporal 1225 instruction template and the memory access, non-temporal 1230 instruction template), while the beta field 1254 is interpreted as a data manipulation field 1254C, whose content distinguishes which one of a number of data manipulation operations (also known as primitives) is to be performed (e.g., no manipulation; broadcast; up conversion of a source; and down conversion of a destination). The memory access 1220 instruction templates include the scale field 1260, and optionally the displacement field 1262A or the displacement scale field 1262B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1252 is interpreted as a write mask control (Z) field 1252C, whose content distinguishes whether the write masking controlled by the write mask field 1270 should be a merging or a zeroing.

In the case of the non-memory access 1205 instruction templates of class B, part of the beta field 1254 is interpreted as an RL field 1257A, whose content distinguishes which one of the different augmentation operation types are to be performed (e.g., round 1257A.1 and vector length (VSIZE) 1257A.2 are respectively specified for the no memory access, write mask control, partial round control type operation 1212 instruction template and the no memory access, write mask control, VSIZE type operation 1217 instruction template), while the rest of the beta field 1254 distinguishes which of the operations of the specified type is to be performed. In the no memory access 1205 instruction templates, the scale field 1260, the displacement field 1262A, and the displacement scale filed 1262B are not present.

In the no memory access, write mask control, partial round control type operation 1210 instruction template, the rest of the beta field 1254 is interpreted as a round operation field 1259A and exception event reporting is disabled (a given instruction does not report any kind of floating-point exception flag and does not raise any floating point exception handler).

Round operation control field 1259A—just as round operation control field 1258, its content distinguishes which one of a group of rounding operations to perform (e.g., Round-up, Round-down, Round-towards-zero and Round-to-nearest). Thus, the round operation control field 1259A allows for the changing of the rounding mode on a per instruction basis. In one example of the disclosure where a processor includes a control register for specifying rounding modes, the round operation control field's 1250 content overrides that register value.

In the no memory access, write mask control, VSIZE type operation 1217 instruction template, the rest of the beta field 1254 is interpreted as a vector length field 1259B, whose content distinguishes which one of a number of data vector lengths is to be performed on (e.g., 128, 256, or 512 byte).

In the case of a memory access 1220 instruction template of class B, part of the beta field 1254 is interpreted as a broadcast field 1257B, whose content distinguishes whether or not the broadcast type data manipulation operation is to be performed, while the rest of the beta field 1254 is interpreted the vector length field 1259B. The memory access 1220 instruction templates include the scale field 1260, and optionally the displacement field 1262A or the displacement scale field 1262B.

With regard to the generic vector friendly instruction format 1200, a full opcode field 1274 is shown including the format field 1240, the base operation field 1242, and the data element width field 1264. While one example is shown where the full opcode field 1274 includes all of these fields, the full opcode field 1274 includes less than all of these fields in examples that do not support all of them. The full opcode field 1274 provides the operation code (opcode).

The augmentation operation field 1250, the data element width field 1264, and the write mask field 1270 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some examples of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different examples of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 13 is a block diagram illustrating an exemplary specific vector friendly instruction format according to examples of the disclosure. FIG. 13 shows a specific vector friendly instruction format 1300 that is specific in the sense that it specifies the location, size, interpretation, and order of the fields, as well as values for some of those fields. The specific vector friendly instruction format 1300 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 12 into which the fields from FIG. 13 map are illustrated.

It should be understood that, although examples of the disclosure are described with reference to the specific vector friendly instruction format 1300 in the context of the generic vector friendly instruction format 1200 for illustrative purposes, the disclosure is not limited to the specific vector friendly instruction format 1300 except where claimed. For example, the generic vector friendly instruction format 1200 contemplates a variety of possible sizes for the various fields, while the specific vector friendly instruction format 1300 is shown as having fields of specific sizes. By way of specific example, while the data element width field 1264 is illustrated as a one bit field in the specific vector friendly instruction format 1300, the disclosure is not so limited (that is, the generic vector friendly instruction format 1200 contemplates other sizes of the data element width field 1264).

The generic vector friendly instruction format 1200 includes the following fields listed below in the order illustrated in FIG. 13A.

EVEX Prefix (Bytes 0-3) 1302—is encoded in a four-byte form.

Format Field 1240 (EVEX Byte 0, bits [7:0])—the first byte (EVEX Byte 0) is the format field 1240 and it contains 0x62 (the unique value used for distinguishing the vector friendly instruction format in one example of the disclosure).

The second-fourth bytes (EVEX Bytes 1-3) include a number of bit fields providing specific capability.

REX field 1305 (EVEX Byte 1, bits [7-5])—consists of an EVEX.R bit field (EVEX Byte 1, bit [7]—R), EVEX.X bit field (EVEX byte 1, bit [6]—X), and 1257BEX byte 1, bit[5]—B). The EVEX.R, EVEX.X, and EVEX.B bit fields provide the same functionality as the corresponding VEX bit fields, and are encoded using 1s complement form, e.g., ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1210—this is the first part of the REX' field 1210 and is the EVEX.R' bit field (EVEX Byte 1, bit [4]—R') that is used to encode either the upper 16 or lower 16 of the extended 32 register set. In one example of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative examples of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1315 (EVEX byte 1, bits [3:0]—mmmm)—its content encodes an implied leading opcode byte (0F, 0F 38, or 0F 3).

Data element width field 1264 (EVEX byte 2, bit [7]—W)—is represented by the notation EVEX.W. EVEX.W is used to define the granularity (size) of the datatype (either 32-bit data elements or 64-bit data elements).

EVEX.vvvv 1320 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 1320 encodes the 4 low-order bits of the first source register specifier stored in inverted (1s complement) form. Depending on the instruction, an extra different EVEX bit field is used to extend the specifier size to 32 registers.

EVEX.0 1268 Class field (EVEX byte 2, bit [2]—U)—If EVEX.0=0, it indicates class A or EVEX.U0; if EVEX.U=1, it indicates class B or EVEX.U1.

Prefix encoding field 1325 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one example, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain examples expand in a similar fashion for consistency but allow for different meanings to be specified by these legacy SIMD prefixes. An alternative example may redesign the PLA to support the 2 bit SIMD prefix encodings, and thus not require the expansion.

Alpha field 1252 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 1254 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1210—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1270 (EVEX byte 3, bits [2:0]-kkk)—its content specifies the index of a register in the write mask registers as previously described. In one example of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1330 (Byte 4) is also known as the opcode byte. Part of the opcode is specified in this field.

MOD R/M Field 1340 (Byte 5) includes MOD field 1342, Reg field 1344, and R/M field 1346. As previously described, the MOD field's 1342 content distinguishes between memory access and non-memory access operations. The role of Reg field 1344 can be summarized to two situations: encoding either the destination register operand or a source register operand, or be treated as an opcode extension and not used to encode any instruction operand. The role of R/M field 1346 may include the following: encoding the instruction operand that references a memory address, or encoding either the destination register operand or a source register operand.

Scale, Index, Base (SIB) Byte (Byte 6)—As previously described, the scale field's 1250 content is used for memory address generation. SIB.xxx 1354 and SIB.bbb 1356—the contents of these fields have been previously referred to with regard to the register indexes Xxxx and Bbbb.

Displacement field 1262A (Bytes 7-10)—when MOD field 1342 contains 10, bytes 7-10 are the displacement field 1262A, and it works the same as the legacy 32-bit displacement (disp32) and works at byte granularity.

Displacement factor field 1262B (Byte 7)—when MOD field 1342 contains 01, byte 7 is the displacement factor field 1262B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1262B is a reinterpretation of disp8; when using displacement factor field 1262B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1262B substitutes the legacy x86 instruction set 8-bit displacement. Thus, the displacement factor field 1262B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1272 operates as previously described.

Full Opcode Field

FIG. 13B is a block diagram illustrating the fields of the specific vector friendly instruction format 1300 that make up the full opcode field 1274 according to one example of the disclosure. Specifically, the full opcode field 1274 includes the format field 1240, the base operation field 1242, and the data element width (W) field 1264. The base operation field 1242 includes the prefix encoding field 1325, the opcode map field 1315, and the real opcode field 1330.

Register Index Field

FIG. 13C is a block diagram illustrating the fields of the specific vector friendly instruction format 1300 that make up the register index field 1244 according to one example of the disclosure. Specifically, the register index field 1244 includes the REX field 1305, the REX' field 1310, the MODR/M.reg field 1344, the MODR/M.r/m field 1346, the VVVV field 1320, xxx field 1354, and the bbb field 1356.

Augmentation Operation Field

Figure 13D:
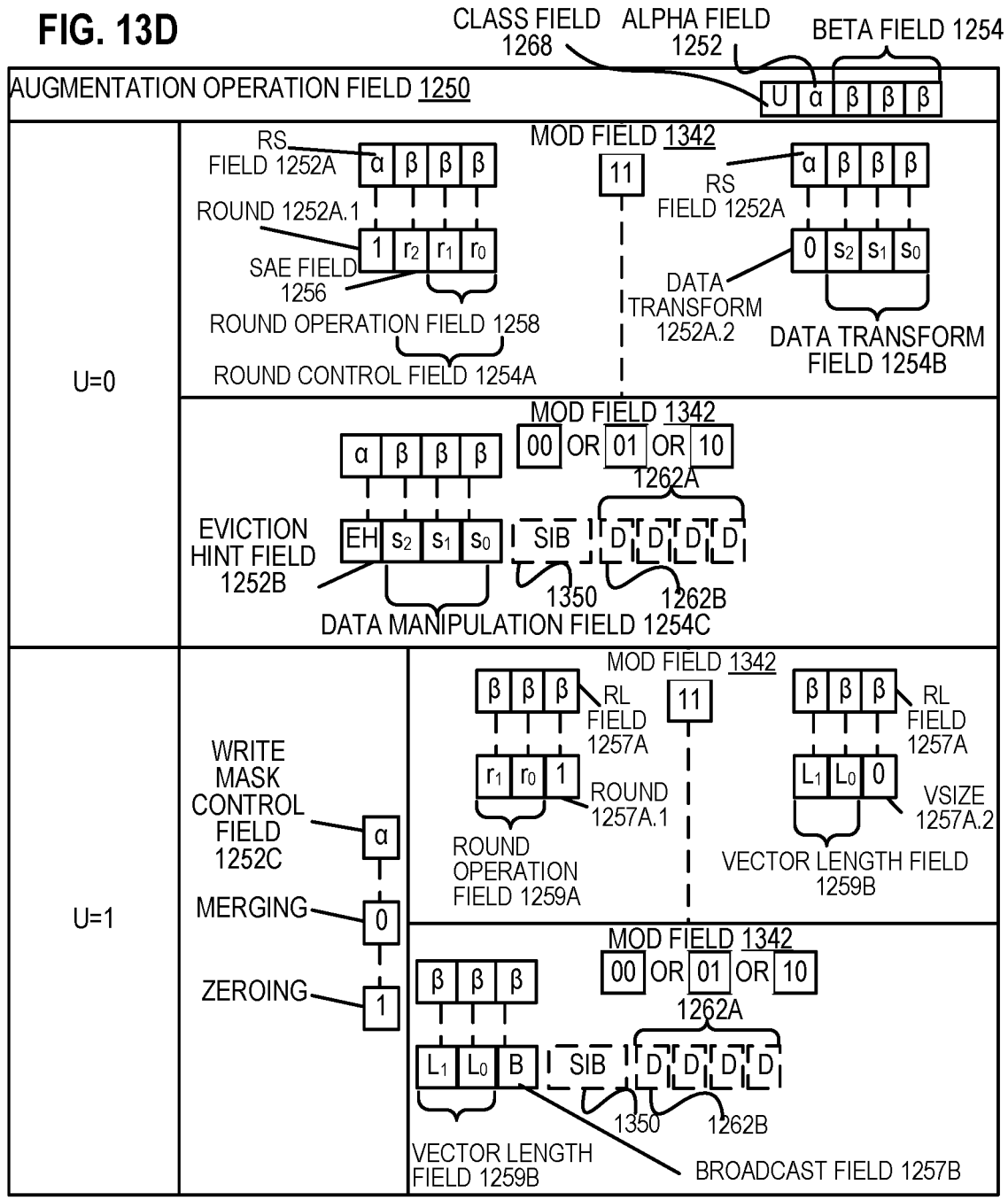
FIG. 13D is a block diagram illustrating the fields of the specific vector friendly instruction format in FIG. 13A that make up the augmentation operation field 1250 according to one example of the disclosure.

FIG. 13D is a block diagram illustrating the fields of the specific vector friendly instruction format 1300 that make up the augmentation operation field 1250 according to one example of the disclosure. When the class (U) field 1268 contains 0, it signifies EVEX.U0 (class A 1268A); when it contains 1, it signifies EVEX.U1 (class B 1268B). When U=0 and the MOD field 1342 contains 11 (signifying a no memory access operation), the alpha field 1252 (EVEX byte 3, bit [7]—EH) is interpreted as the rs field 1252A. When the rs field 1252A contains a 1 (round 1252A.1), the beta field 1254 (EVEX byte 3, bits [6:4]—SSS) is interpreted as the round control field 1254A. The round control field 1254A includes a one bit SAE field 1256 and a two bit round operation field 1258. When the rs field 1252A contains a 0 (data transform 1252A.2), the beta field 1254 (EVEX byte 3, bits [6:4]—SSS) is interpreted as a three bit data transform field 1254B. When U=0 and the MOD field 1342 contains 00, 01, or 10 (signifying a memory access operation), the alpha field 1252 (EVEX byte 3, bit [7]—EH) is interpreted as the eviction hint (EH) field 1252B and the beta field 1254 (EVEX byte 3, bits [6:4]—SSS) is interpreted as a three bit data manipulation field 1254C.

When U=1, the alpha field 1252 (EVEX byte 3, bit [7]—EH) is interpreted as the write mask control (Z) field 1252C. When U=1 and the MOD field 1342 contains 11 (signifying a no memory access operation), part of the beta field 1254 (EVEX byte 3, bit [4]—$S_0$) is interpreted as the RL field 1257A; when it contains a 1 (round 1257A.1) the rest of the beta field 1254 (EVEX byte 3, bit [6-5]—$S_{2-1}$) is interpreted as the round operation field 1259A, while when the RL field 1257A contains a 0 (VSIZE 1257.A2) the rest of the beta field 1254 (EVEX byte 3, bit [6-5]—$S_{2-1}$) is interpreted as the vector length field 1259B (EVEX byte 3, bit [6-5]—$L_{1-0}$). When U=1 and the MOD field 1342 contains 00, 01, or 10 (signifying a memory access operation), the beta field 1254 (EVEX byte 3, bits [6:4]—SSS) is interpreted as the vector length field 1259B (EVEX byte 3, bit [6-5]-$L_{1-0}$) and the broadcast field 1257B (EVEX byte 3, bit [4]-B).

Exemplary Register Architecture

Figure 14:
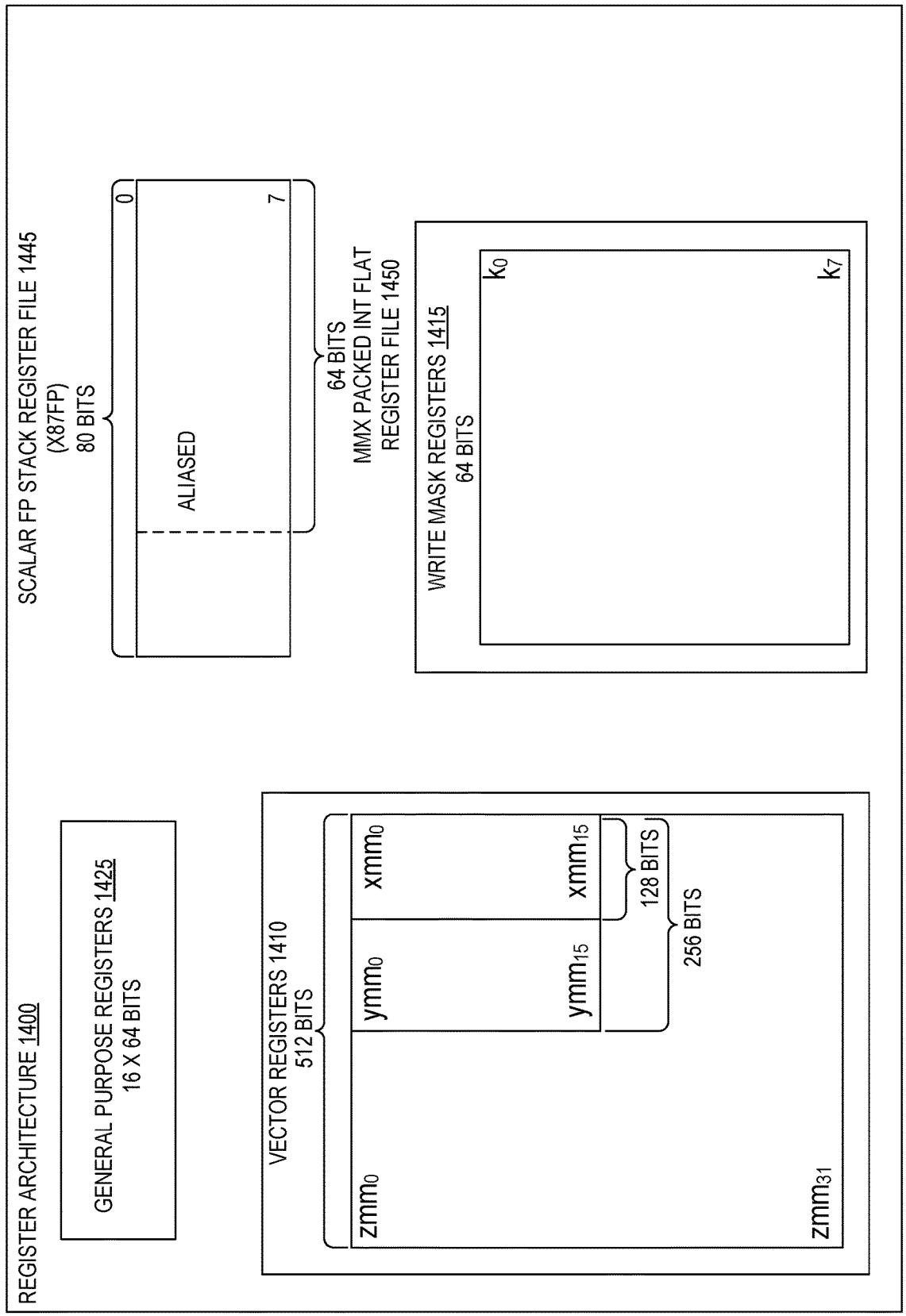
FIG. 14 is a block diagram of a register architecture according to one example of the disclosure

FIG. 14 is a block diagram of a register architecture 1400 according to one example of the disclosure. In the example illustrated, there are 32 vector registers 1410 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1300 operates on these overlaid register file as illustrated in the below tables.

| Adjustable Vector Length | Class | Operations | Registers |
|---|---|---|---|
| Instruction Templates that do not include the vector length field 1259B | A (FIG. 12A; U = 0) | 1210, 1215, 1225, 1230 | zmm registers (the vector length is 64 byte) |
| | B (FIG. 12B; U = 1) | 1212 | zmm registers (the vector length is 64 byte) |
| Instruction templates that do include the vector length field 1259B | B (FIG. 12B; U = 1) | 1217, 1227 | zmm, ymm, or xmm registers (the vector length is 64 byte, 32 byte, or 16 byte) depending on the vector length field 1259B |

In other words, the vector length field 1259B selects between a maximum length and one or more other shorter lengths, where each such shorter length is half the length of the preceding length; and instructions templates without the vector length field 1259B operate on the maximum vector length. Further, in one example, the class B instruction templates of the specific vector friendly instruction format 1300 operate on packed or scalar single/double-precision floating point data and packed or scalar integer data. Scalar operations are operations performed on the lowest order data element position in a zmm/ymm/xmm register; the higher order data element positions are either left the same as they were prior to the instruction or zeroed depending on the example.

Write mask registers 1415—in the example illustrated, there are 8 write mask registers (k0 through k7), each 64 bits in size. In an alternate example, the write mask registers 1415 are 16 bits in size. As previously described, in one example of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 1425—in the example illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1445, on which is aliased the MMX packed integer flat register file 1450—in the example illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative examples of the disclosure may use wider or narrower registers. Additionally, alternative examples of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 15A is a block diagram illustrating both an exemplary in-order pipeline and an exemplary register renaming, out-of-order issue/execution pipeline according to examples of the disclosure. FIG. 15B is a block diagram illustrating both an exemplary example of an in-order architecture core and an exemplary register renaming, out-of-order issue/execution architecture core to be included in a processor according to examples of the disclosure. The solid lined boxes in FIGS. 15A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 15A, a processor pipeline 1500 includes a fetch stage 1502, a length decode stage 1504, a decode stage 1506, an allocation stage 1508, a renaming stage 1510, a scheduling (also known as a dispatch or issue) stage 1512, a register read/memory read stage 1514, an execute stage 1516, a write back/memory write stage 1518, an exception handling stage 1522, and a commit stage 1524.

FIG. 15B shows processor core 1590 including a front end unit 1530 coupled to an execution engine unit 1550, and both are coupled to a memory unit 1570. The core 1590 may be a reduced instruction set computing (RISC) core, a complex instruction set computing (CISC) core, a very long instruction word (VLIW) core, or a hybrid or alternative core type. As yet another option, the core 1590 may be a special-purpose core, such as, for example, a network or communication core, compression engine, coprocessor core, general purpose computing graphics processing unit (GPGPU) core, graphics core, or the like.

The front end unit 1530 includes a branch prediction unit 1532 coupled to an instruction cache unit 1534, which is coupled to an instruction translation lookaside buffer (TLB) 1536, which is coupled to an instruction fetch unit 1538, which is coupled to a decode unit 1540. The decode unit 1540 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 1540 may be implemented using various different mechanisms. Examples of suitable mechanisms include, but are not limited to, look-up tables, hardware implementations, programmable logic arrays (PLAs), microcode read only memories (ROMs), etc. In one example, the core 1590 includes a microcode ROM or other medium that stores microcode for certain macro-instructions (e.g., in decode unit 1540 or otherwise within the front end unit 1530). The decode unit 1540 is coupled to a rename/allocator unit 1552 in the execution engine unit 1550.

The execution engine unit 1550 includes the rename/allocator unit 1552 coupled to a retirement unit 1554 and a set of one or more scheduler unit(s) 1556. The scheduler unit(s) 1556 represents any number of different schedulers, including reservations stations, central instruction window, etc. The scheduler unit(s) 1556 is coupled to the physical register file(s) unit(s) 1558. Each of the physical register file(s) units 1558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one example, the physical register file(s) unit 1558 comprises a vector registers unit, a write mask registers unit, and a scalar registers unit. These register units may provide architectural vector registers, vector mask registers, and general purpose registers. The physical register file(s) unit(s) 1558 is overlapped by the retirement unit 1554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1554 and the physical register file(s) unit(s) 1558 are coupled to the execution cluster(s) 1560. The execution cluster(s) 1560 includes a set of one or more execution units 1562 and a set of one or more memory access units 1564. The execution units 1562 may perform various operations (e.g., shifts, addition, subtraction, multiplication) and on various types of data (e.g., scalar floating point, packed integer, packed floating point, vector integer, vector floating point). While some examples may include a number of execution units dedicated to specific functions or sets of functions, other examples may include only one execution unit or multiple execution units that all perform all functions. The scheduler unit(s) 1556, physical register file(s) unit(s) 1558, and execution cluster(s) 1560 are shown as being possibly plural because certain examples create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain examples are implemented in which only the execution cluster of this pipeline has the memory access unit(s) 1564). It should also be understood that where separate pipelines are used, one or more of these pipelines may be out-of-order issue/execution and the rest in-order.

The set of memory access units 1564 is coupled to the memory unit 1570, which includes a data TLB unit 1572 coupled to a data cache unit 1574 coupled to a level 2 (L2) cache unit 1576. In one exemplary example, the memory access units 1564 may include a load unit, a store address unit, and a store data unit, each of which is coupled to the data TLB unit 1572 in the memory unit 1570. The instruction cache unit 1534 is further coupled to a level 2 (L2) cache unit 1576 in the memory unit 1570. The L2 cache unit 1576 is coupled to one or more other levels of cache and eventually to a main memory.

In certain examples, a prefetch circuit 1578 is included to prefetch data, for example, to predict access addresses and bring the data for those addresses into a cache or caches (e.g., from memory 1580).

By way of example, the exemplary register renaming, out-of-order issue/execution core architecture may implement the pipeline 1500 as follows: 1) the instruction fetch 1538 performs the fetch and length decoding stages 1502 and 1504; 2) the decode unit 1540 performs the decode stage 1506; 3) the rename/allocator unit 1552 performs the allocation stage 1508 and renaming stage 1510; 4) the scheduler unit(s) 1556 performs the schedule stage 1512; 5) the physical register file(s) unit(s) 1558 and the memory unit 1570 perform the register read/memory read stage 1514; the execution cluster 1560 perform the execute stage 1516; 6) the memory unit 1570 and the physical register file(s) unit(s) 1558 perform the write back/memory write stage 1518; 7) various units may be involved in the exception handling stage 1522; and 8) the retirement unit 1554 and the physical register file(s) unit(s) 1558 perform the commit stage 1524.

The core 1590 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one example, the core 1590 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyper-Threading technology).

Figure 16B:
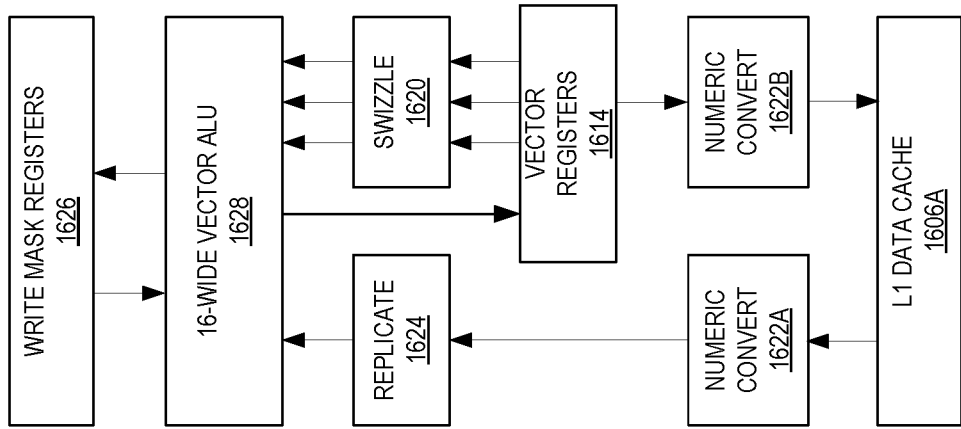
FIG. 16B is an expanded view of part of the processor core in FIG. 16A according to examples of the disclosure.
Figure 16A:
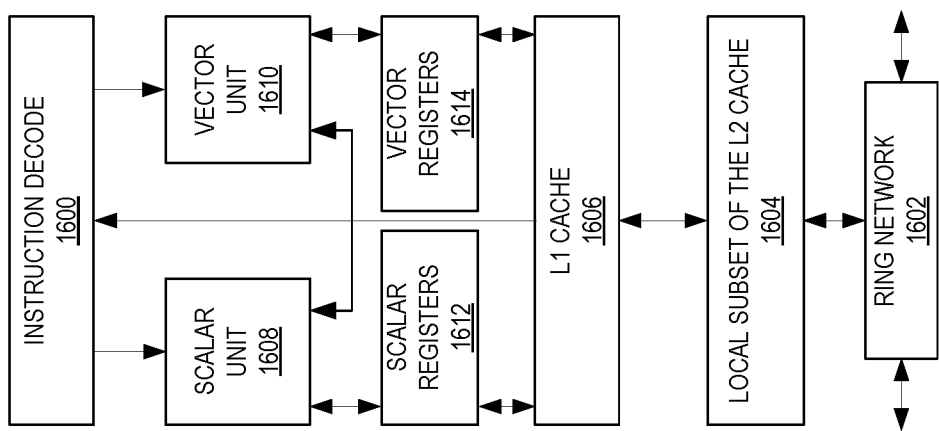
FIG. 16A is a block diagram of a single processor core, along with its connection to the on-die interconnect network and with its local subset of the Level 2 (L2) cache, according to examples of the disclosure.

While register renaming is described in the context of out-of-order execution, it should be understood that register renaming may be used in an in-order architecture. While the illustrated example of the processor also includes separate instruction and data cache units 1534/1574 and a shared L2 cache unit 1576, alternative examples may have a single internal cache for both instructions and data, such as, for example, a Level 1 (L1) internal cache, or multiple levels of internal cache. In some examples, the system may include a combination of an internal cache and an external cache that is external to the core and/or the processor. Alternatively, all of the cache may be external to the core and/or the processor.
Specific Exemplary In-Order Core Architecture FIGS. 16A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory IO interfaces, and other necessary IO logic, depending on the application.

FIG. 16A is a block diagram of a single processor core, along with its connection to the on-die interconnect network 1602 and with its local subset of the Level 2 (L2) cache 1604, according to examples of the disclosure. In one example, an instruction decode unit 1600 supports the x86 instruction set with a packed data instruction set extension. An L1 cache 1606 allows low-latency accesses to cache memory into the scalar and vector units. While in one example (to simplify the design), a scalar unit 1608 and a vector unit 1610 use separate register sets (respectively, scalar registers 1612 and vector registers 1614) and data transferred between them is written to memory and then read back in from a level 1 (L1) cache 1606, alternative examples of the disclosure may use a different approach (e.g., use a single register set or include a communication path that allow data to be transferred between the two register files without being written and read back).

The local subset of the L2 cache 1604 is part of a global L2 cache that is divided into separate local subsets, one per processor core. Each processor core has a direct access path to its own local subset of the L2 cache 1604. Data read by a processor core is stored in its L2 cache subset 1604 and can be accessed quickly, in parallel with other processor cores accessing their own local L2 cache subsets. Data written by a processor core is stored in its own L2 cache subset 1604 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 16B is an expanded view of part of the processor core in FIG. 16A according to examples of the disclosure. FIG. 16B includes an L1 data cache 1606A part of the L1 cache 1604, as well as more detail regarding the vector unit 1610 and the vector registers 1614. Specifically, the vector unit 1610 is a 16-wide vector processing unit (VPU) (see the 16-wide ALU 1628), which executes one or more of integer, single-precision float, and double-precision float instructions. The VPU supports swizzling the register inputs with swizzle unit 1620, numeric conversion with numeric convert units 1622A-B, and replication with replication unit 1624 on the memory input. Write mask registers 1626 allow predicating resulting vector writes.

Figure 17:
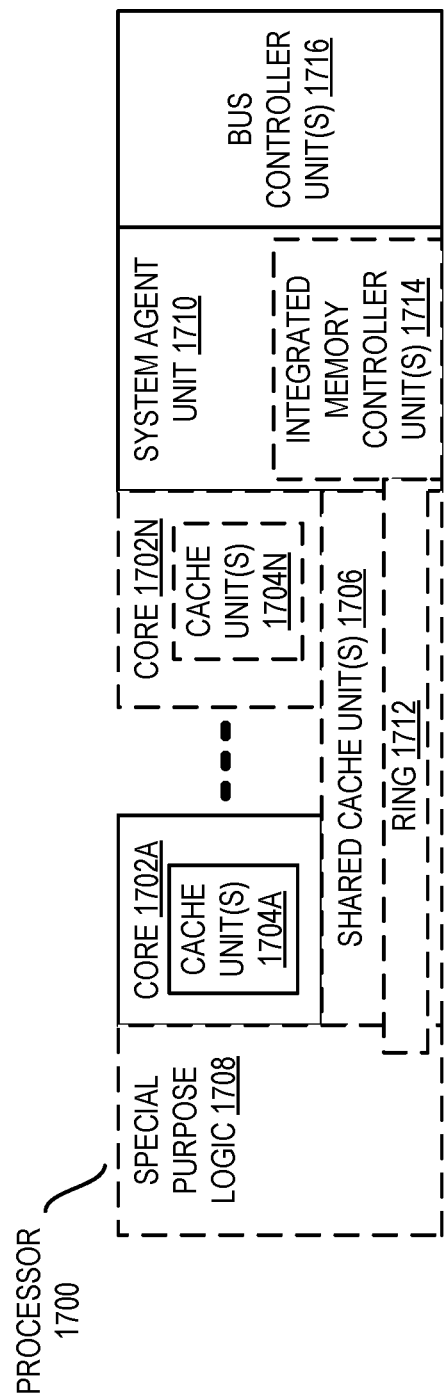
FIG. 17 is a block diagram of a processor that may have more than one core, may have an integrated memory controller, and may have integrated graphics according to examples of the disclosure.

FIG. 17 is a block diagram of a processor 1700 that may have more than one core, may have an integrated memory controller, and may have integrated graphics according to examples of the disclosure. The solid lined boxes in FIG. 17 illustrate a processor 1700 with a single core 1702A, a system agent 1710, a set of one or more bus controller units 1716, while the optional addition of the dashed lined boxes illustrates an alternative processor 1700 with multiple cores 1702A-N, a set of one or more integrated memory controller unit(s) 1714 in the system agent unit 1710, and special purpose logic 1708.

Thus, different implementations of the processor 1700 may include: 1) a CPU with the special purpose logic 1708 being integrated graphics and/or scientific (throughput) logic (which may include one or more cores), and the cores 1702A-N being one or more general purpose cores (e.g., general purpose in-order cores, general purpose out-of-order cores, a combination of the two); 2) a coprocessor with the cores 1702A-N being a large number of special purpose cores intended primarily for graphics and/or scientific (throughput); and 3) a coprocessor with the cores 1702A-N being a large number of general purpose in-order cores. Thus, the processor 1700 may be a general-purpose processor, coprocessor, or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1700 may be a part of and/or may be implemented on one or more substrates using any of a number of process technologies, such as, for example, BiCMOS, CMOS, or NMOS.

The memory hierarchy includes one or more levels of cache 1704A to 1704N within the cores 1702A to 1702N, a set or one or more shared cache units 1706, and external memory (not shown) coupled to the set of integrated memory controller units 1714. The set of shared cache units 1706 may include one or more mid-level caches, such as level 2 (L2), level 3 (L3), level 4 (L4), or other levels of cache, a last level cache (LLC), and/or combinations thereof. While in one example a ring based interconnect unit 1712 interconnects the integrated graphics logic 1708, the set of shared cache units 1706, and the system agent unit 1710/ integrated memory controller unit(s) 1714, alternative examples may use any number of well-known techniques for interconnecting such units. In one example, coherency is maintained between one or more cache units 1706 and cores 1702-A-N.

In some examples, one or more of the cores 1702A-N are capable of multi-threading. The system agent 1710 includes those components coordinating and operating cores 1702A-N. The system agent unit 1710 may include for example a power control unit (PCU) and a display unit. The PCU may be or include logic and components needed for regulating the power state of the cores 1702A-N and the integrated graphics logic 1708. The display unit is for driving one or more externally connected displays.

The cores 1702A-N may be homogenous or heterogeneous in terms of architecture instruction set; that is, two or more of the cores 1702A-N may be capable of execution the same instruction set, while others may be capable of executing only a subset of that instruction set or a different instruction set.
Exemplary Computer Architectures FIGS. 18-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 18:
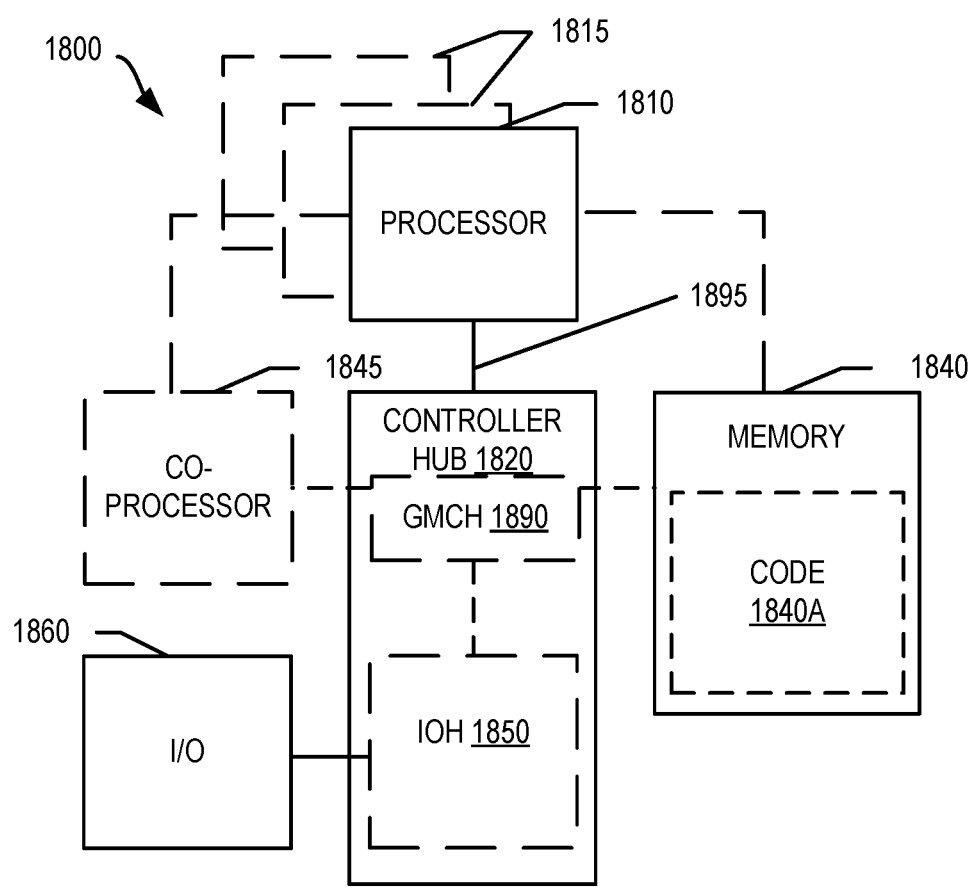
FIG. 18 is a block diagram of a system in accordance with one example of the present disclosure.

Referring now to FIG. 18, shown is a block diagram of a system 1800 in accordance with one example of the present disclosure. The system 1800 may include one or more processors 1810, 1815, which are coupled to a controller hub 1820. In one example the controller hub 1820 includes a graphics memory controller hub (GMCH) 1890 and an Input/Output Hub (IOH) 1850 (which may be on separate chips); the GMCH 1890 includes memory and graphics controllers to which are coupled memory 1840 and a coprocessor 1845; the IOH 1850 is couples input/output (IO) devices 1860 to the GMCH 1890. Alternatively, one or both of the memory and graphics controllers are integrated within the processor (as described herein), the memory 1840 and the coprocessor 1845 are coupled directly to the processor 1810, and the controller hub 1820 in a single chip with the IOH 1850. Memory 1840 may include code 1840A, for example, that when executed causes a processor to perform any method of this disclosure.

The optional nature of additional processors 1815 is denoted in FIG. 18 with broken lines. Each processor 1810, 1815 may include one or more of the processing cores described herein and may be some version of the processor 1700.

The memory 1840 may be, for example, dynamic random access memory (DRAM), phase change memory (PCM), or a combination of the two. For at least one example, the controller hub 1820 communicates with the processor(s) 1810, 1815 via a multi-drop bus, such as a frontside bus (FSB), point-to-point interface such as Quickpath Interconnect (QPI), or similar connection 1895.

In one example, the coprocessor 1845 is a special-purpose processor, such as, for example, a high-throughput MIC processor, a network or communication processor, compression engine, graphics processor, GPGPU, embedded processor, or the like. In one example, controller hub 1820 may include an integrated graphics accelerator.

There can be a variety of differences between the physical resources 1810, 1815 in terms of a spectrum of metrics of merit including architectural, microarchitectural, thermal, power consumption characteristics, and the like.

In one example, the processor 1810 executes instructions that control data processing operations of a general type. Embedded within the instructions may be coprocessor instructions. The processor 1810 recognizes these coprocessor instructions as being of a type that should be executed by the attached coprocessor 1845. Accordingly, the processor 1810 issues these coprocessor instructions (or control signals representing coprocessor instructions) on a coprocessor bus or other interconnect, to coprocessor 1845. Coprocessor(s) 1845 accept and execute the received coprocessor instructions.

Figure 19:
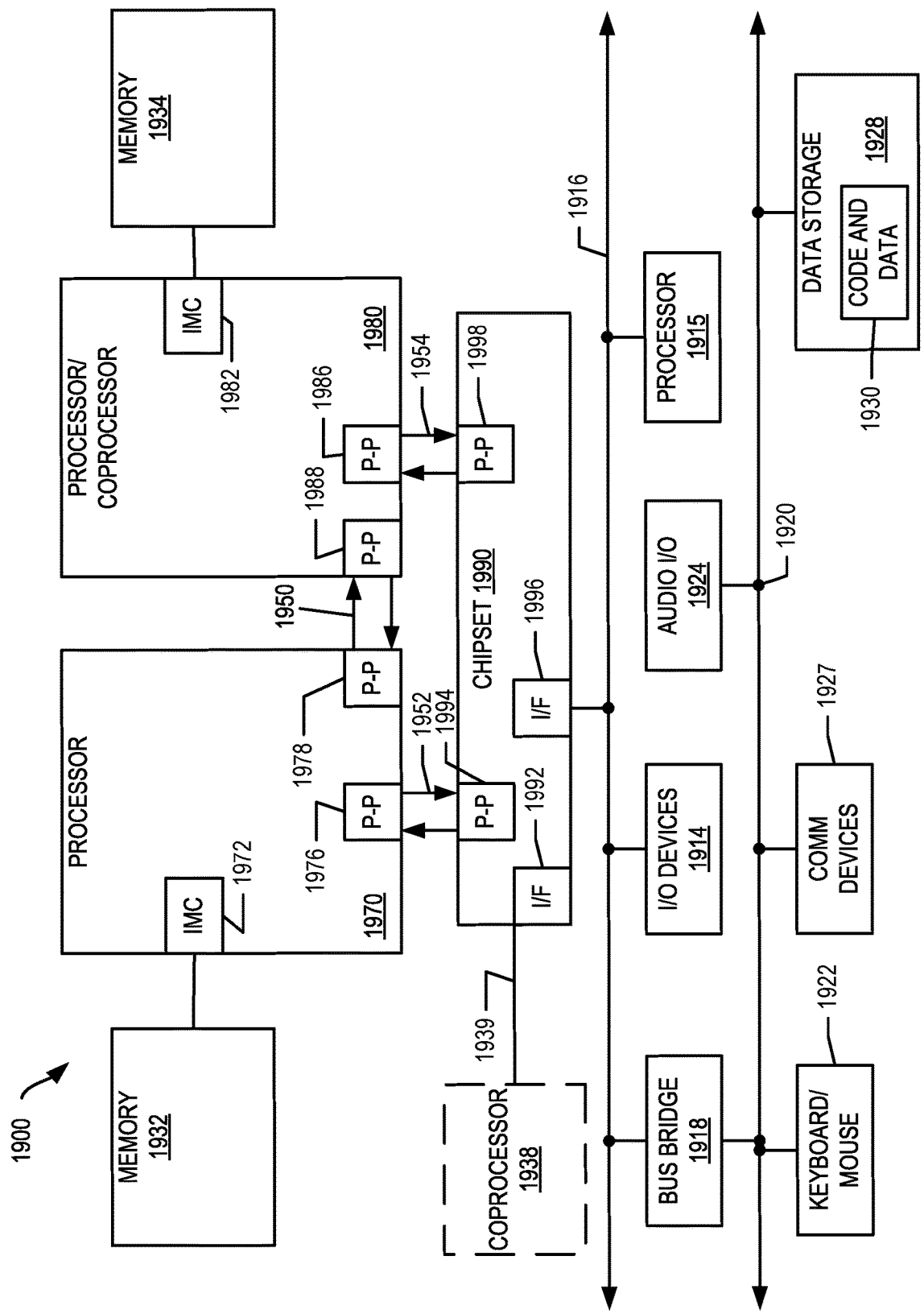
FIG. 19 is a block diagram of a more specific exemplary system in accordance with an example of the present disclosure.

Referring now to FIG. 19, shown is a block diagram of a first more specific exemplary system 1900 in accordance with an example of the present disclosure. As shown in FIG. 19, multiprocessor system 1900 is a point-to-point interconnect system, and includes a first processor 1970 and a second processor 1980 coupled via a point-to-point interconnect 1950. Each of processors 1970 and 1980 may be some version of the processor 1700. In one example of the disclosure, processors 1970 and 1980 are respectively processors 1810 and 1815, while coprocessor 1938 is coprocessor 1845. In another example, processors 1970 and 1980 are respectively processor 1810 coprocessor 1845.

Processors 1970 and 1980 are shown including integrated memory controller (IMC) units 1972 and 1982, respectively. Processor 1970 also includes as part of its bus controller units point-to-point (P-P) interfaces 1976 and 1978; similarly, second processor 1980 includes P-P interfaces 1986 and 1988. Processors 1970, 1980 may exchange information via a point-to-point (P-P) interface 1950 using P-P interface circuits 1978, 1988. As shown in FIG. 19, IMCs 1972 and 1982 couple the processors to respective memories, namely a memory 1932 and a memory 1934, which may be portions of main memory locally attached to the respective processors.

Processors 1970, 1980 may each exchange information with a chipset 1990 via individual P-P interfaces 1952, 1954 using point to point interface circuits 1976, 1994, 1986, 1998. Chipset 1990 may optionally exchange information with the coprocessor 1938 via a high-performance interface 1939. In one example, the coprocessor 1938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1990 may be coupled to a first bus 1916 via an interface 1996. In one example, first bus 1916 may be a Peripheral Component Interconnect (PCI) bus, or a bus such as a PCI Express bus or another third generation 10 interconnect bus, although the scope of the present disclosure is not so limited.

As shown in FIG. 19, various 10 devices 1914 may be coupled to first bus 1916, along with a bus bridge 1918 which couples first bus 1916 to a second bus 1920. In one example, one or more additional processor(s) 1915, such as coprocessors, high-throughput MIC processors, GPGPU's, accelerators (such as, e.g., graphics accelerators or digital signal processing (DSP) units), field programmable gate arrays, or any other processor, are coupled to first bus 1916. In one example, second bus 1920 may be a low pin count (LPC) bus. Various devices may be coupled to a second bus 1920 including, for example, a keyboard and/or mouse 1922, communication devices 1927 and a storage unit 1928 such as a disk drive or other mass storage device which may include instructions/code and data 1930, in one example. Further, an audio IO 1924 may be coupled to the second bus 1920. Note that other architectures are possible. For example, instead of the point-to-point architecture of FIG. 19, a system may implement a multi-drop bus or other such architecture.

Figure 20:
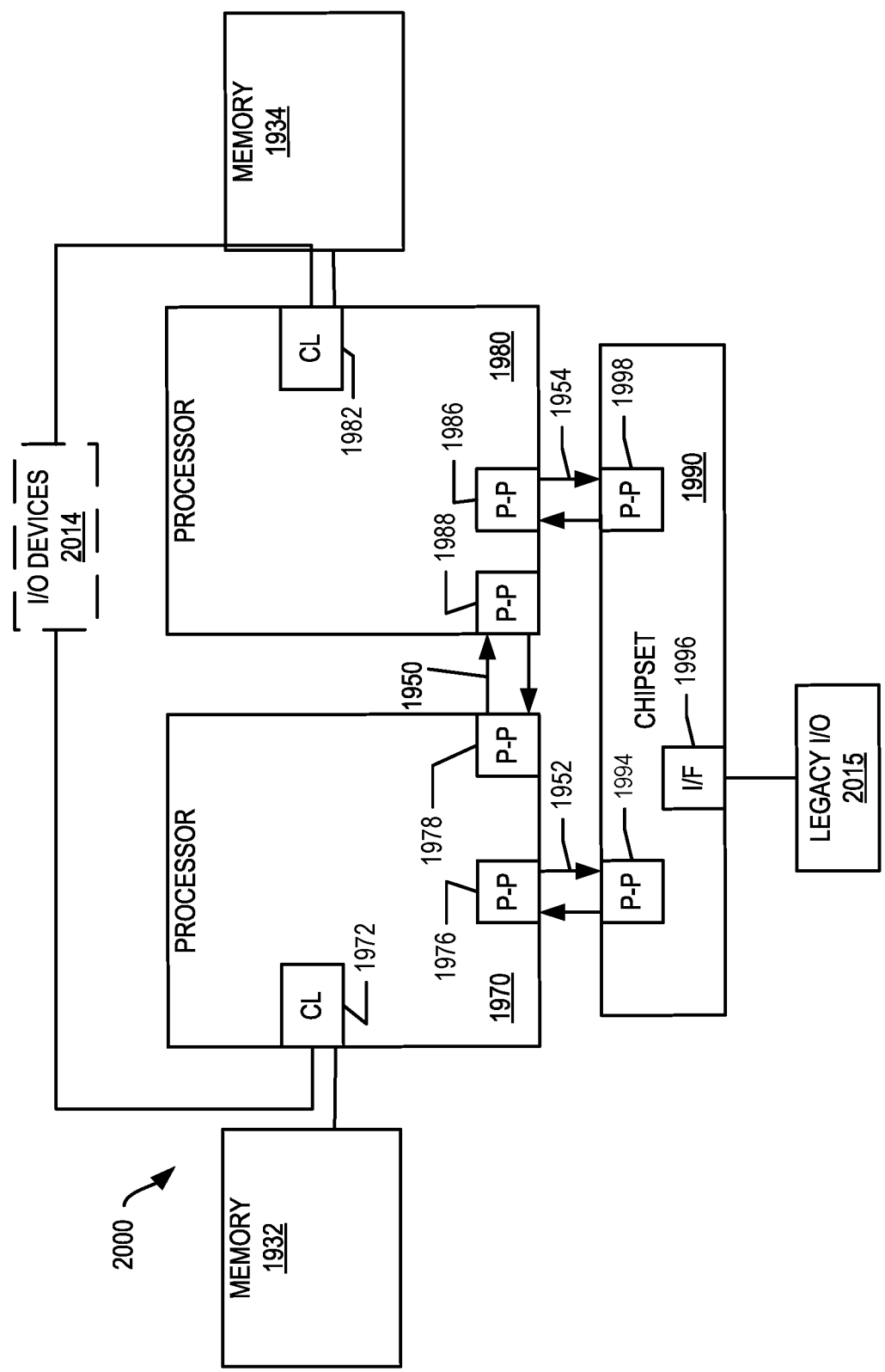
FIG. 20, shown is a block diagram of a second more specific exemplary system in accordance with an example of the present disclosure.

Referring now to FIG. 20, shown is a block diagram of a second more specific exemplary system 2000 in accordance with an example of the present disclosure. Like elements in FIGS. 19 and 20 bear like reference numerals, and certain aspects of FIG. 19 have been omitted from FIG. 20 in order to avoid obscuring other aspects of FIG. 20.

FIG. 20 illustrates that the processors 1970, 1980 may include integrated memory and TO control logic ("CL") 1972 and 1982, respectively. Thus, the CL 1972, 1982 include integrated memory controller units and include IO control logic. FIG. 20 illustrates that not only are the memories 1932, 1934 coupled to the CL 1972, 1982, but also that TO devices 2014 are also coupled to the control logic 1972, 1982. Legacy IO devices 2015 are coupled to the chipset 1990.

Figure 21:
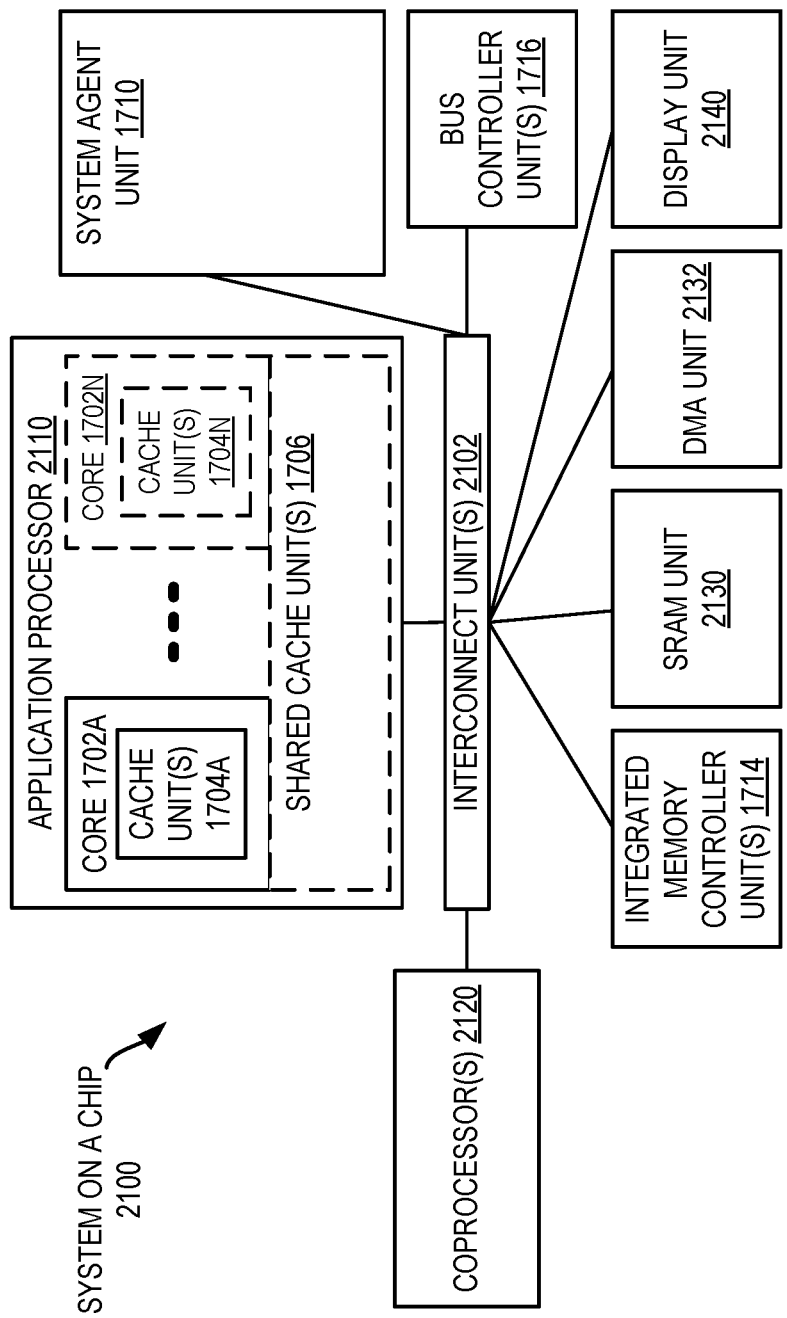
FIG. 21, shown is a block diagram of a system on a chip (SoC) in accordance with an example of the present disclosure.

Referring now to FIG. 21, shown is a block diagram of a SoC 2100 in accordance with an example of the present disclosure. Similar elements in FIG. 17 bear like reference numerals. Also, dashed lined boxes are optional features on more advanced SoCs. In FIG. 21, an interconnect unit(s) 2102 is coupled to: an application processor 2110 which includes a set of one or more cores 1702A-N and shared cache unit(s) 1706; a system agent unit 1710; a bus controller unit(s) 1716; an integrated memory controller unit(s) 1714; a set or one or more coprocessors 2120 which may include integrated graphics logic, an image processor, an audio processor, and a video processor; an static random access memory (SRAM) unit 2130; a direct memory access (DMA) unit 2132; and a display unit 2140 for coupling to one or more external displays. In one example, the coprocessor(s) 2120 include a special-purpose processor, such as, for example, a network or communication processor, compression engine, GPGPU, a high-throughput MIC processor, embedded processor, or the like.

Examples (e.g., of the mechanisms) disclosed herein may be implemented in hardware, software, firmware, or a combination of such implementation approaches. Examples of the disclosure may be implemented as computer programs or program code executing on programmable systems comprising at least one processor, a storage system (including volatile and non-volatile memory and/or storage elements), at least one input device, and at least one output device.

Program code, such as code 1930 illustrated in FIG. 19, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples of the disclosure also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 22:
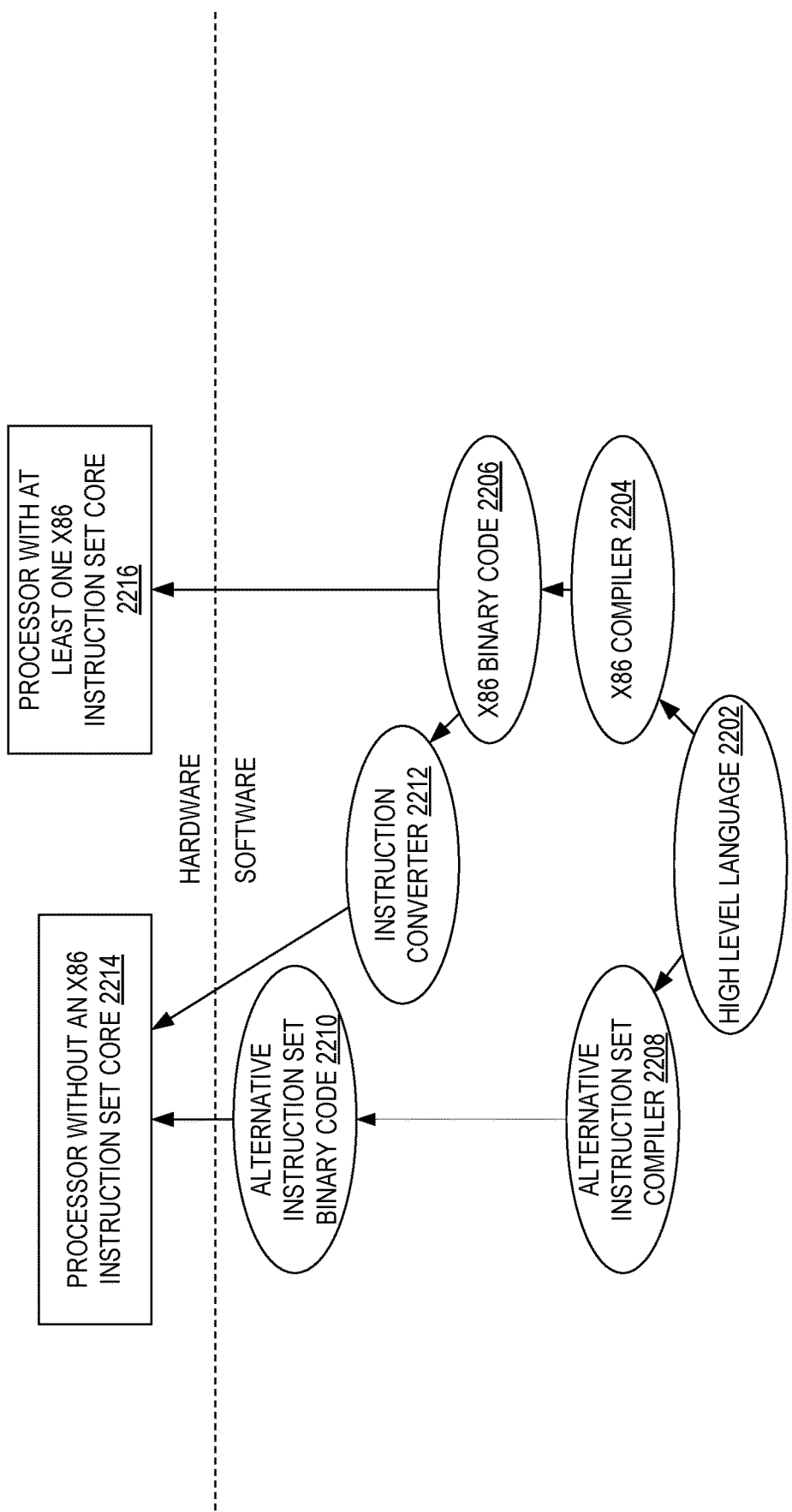
FIG. 22 is a block diagram contrasting the use of a software instruction converter to convert binary instructions in a source instruction set to binary instructions in a target instruction set according to examples of the disclosure.

FIG. 22 is a block diagram contrasting the use of a software instruction converter to convert binary instructions in a source instruction set to binary instructions in a target instruction set according to examples of the disclosure. In the illustrated example, the instruction converter is a software instruction converter, although alternatively the instruction converter may be implemented in software, firmware, hardware, or various combinations thereof. FIG. 22 shows a program in a high level language 2202 may be compiled using an x86 compiler 2204 to generate x86 binary code 2206 that may be natively executed by a processor with at least one x86 instruction set core 2216. The processor with at least one x86 instruction set core 2216 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 2204 represents a compiler that is operable to generate x86 binary code 2206 (e.g., object code) that can, with or without additional linkage processing, be executed on the processor with at least one x86 instruction set core 2216. Similarly, FIG. 22 shows the program in the high level language 2202 may be compiled using an alternative instruction set compiler 2208 to generate alternative instruction set binary code 2210 that may be natively executed by a processor without at least one x86 instruction set core 2214 (e.g., a processor with cores that execute the MIPS instruction set of MIPS Technologies of Sunnyvale, CA and/or that execute the ARM instruction set of ARM Holdings of Sunnyvale, CA). The instruction converter 2212 is used to convert the x86 binary code 2206 into code that may be natively executed by the processor without an x86 instruction set core 2214. This converted code is not likely to be the same as the alternative instruction set binary code 2210 because an instruction converter capable of this is difficult to make; however, the converted code will accomplish the general operation and be made up of instructions from the alternative instruction set. Thus, the instruction converter 2212 represents software, firmware, hardware, or a combination thereof that, through emulation, simulation, or any other process, allows a processor or other electronic device that does not have an x86 instruction set processor or core to execute the x86 binary code 2206.

What is claimed is:

1. An apparatus comprising:
a hardware processor core to implement a trust domain manager to manage one or more hardware isolated virtual machines as a respective trust domain with a region of protected memory, and assign a micro-context identification value, that is not readable by privileged system code that is to execute on the hardware processor core, to each granule of a plurality of granules of physical memory of the protected memory; and
a memory management circuit coupled between the hardware processor core and the physical memory, wherein the memory management circuit is to prevent data in the protected memory having a first micro-context identification value from being accessed by code based on the code having a different micro-context identification value.

2. The apparatus of claim 1, wherein the trust domain manager is to store each micro-context identification value in a data structure that includes a virtual address to physical address mapping for each granule of the plurality of granules of the physical memory of the protected memory.

3. The apparatus of claim 2, wherein the memory management circuit is to prevent data in the protected memory having a first virtual address from being accessed by code having a different virtual address in its virtual address to physical address mapping in the data structure.

4. The apparatus of claim 2, wherein the physical memory comprises a plurality of pages, and the data structure comprises a micro-context identification value for each granule of the plurality of granules of each page of the physical memory and a virtual address to physical address mapping for each page.

5. The apparatus of claim 1, wherein the granule is less than a page of the physical memory.

6. The apparatus of claim 1, wherein the privileged system code includes an operating system and a virtual machine monitor of the one or more hardware isolated virtual machines that are to execute on the hardware processor core.

7. The apparatus of claim 1, wherein, in response to a request from the privileged system code to provide a function to a trust domain to execute, the trust domain manager is to store the function in the protected memory, and assign each granule of memory utilized to store the function a same micro-context identification value.

8. The apparatus of claim 1, wherein, in response to a request from the privileged system code to store data into the protected memory, the trust domain manager is to overwrite any assigned micro-context identification values with a micro-context identification value for code that is currently executing.

9. A method comprising:
managing one or more hardware isolated virtual machines as a respective trust domain with a region of protected memory by a trust domain manager of a hardware processor core;
assigning a micro-context identification value, that is not readable by privileged system code that is executing on the hardware processor core, to each granule of a plurality of granules of physical memory of the protected memory by the trust domain manager of the hardware processor core;
allowing, by a memory management circuit coupled between the hardware processor core and the physical memory, a first memory access of data in the protected memory having a first micro-context identification value requested by a first code based on the first code having the first micro-context identification value; and
preventing, by the memory management circuit, a second memory access of the data in the protected memory having the first micro-context identification value requested by a second code based on the second code having a different micro-context identification value.

10. The method of claim 9, further comprising storing, by the trust domain manager, each micro-context identification value in a data structure that includes a virtual address to physical address mapping for each granule of the plurality of granules of the physical memory of the protected memory.

11. The method of claim 10, further comprising preventing, by the memory management circuit, data in the protected memory having a first virtual address from being accessed by code having a different virtual address in its virtual address to physical address mapping in the data structure.

12. The method of claim 10, wherein the physical memory comprises a plurality of pages, and the data structure comprises a micro-context identification value for each granule of the plurality of granules of each page of the physical memory and a virtual address to physical address mapping for each page.

13. The method of claim 9, wherein the granule is less than a page of the physical memory.

14. The method of claim 9, wherein the privileged system code includes an operating system and a virtual machine monitor of the one or more hardware isolated virtual machines that are executing on the hardware processor core.

15. The method of claim 9, further comprising, in response to a request from the privileged system code to provide a function to a trust domain to execute:
storing the function in the protected memory, and
assigning each granule of memory utilized to store the function a same micro-context identification value by the trust domain manager.

16. The method of claim 9, further comprising, in response to a request from the privileged system code to store data into the protected memory:
overwriting, by the trust domain manager, any assigned micro-context identification values with a micro-context identification value for code that is currently executing.

17. An apparatus comprising:
a physical memory;
a hardware processor core to implement a trust domain manager to manage one or more hardware isolated virtual machines as a respective trust domain with a region of protected memory, and assign a micro-context identification value, that is not readable by privileged system code that is to execute on the hardware processor core, to each granule of a plurality of granules of the physical memory of the protected memory; and
a memory management circuit coupled between the hardware processor core and the physical memory, wherein the memory management circuit is to prevent data in the protected memory having a first micro-context identification value from being accessed by code based on the code having a different micro-context identification value.

18. The apparatus of claim 17, wherein the trust domain manager is to store each micro-context identification value in a data structure that includes a virtual address to physical address mapping for each granule of the plurality of granules of the physical memory of the protected memory.

19. The apparatus of claim 18, wherein the memory management circuit is to prevent data in the protected memory having a first virtual address from being accessed by code having a different virtual address in its virtual address to physical address mapping in the data structure.

20. The apparatus of claim 18, wherein the physical memory comprises a plurality of pages, and the data structure comprises a micro-context identification value for each granule of the plurality of granules of each page of the physical memory and a virtual address to physical address mapping for each page.

21. The apparatus of claim 17, wherein the granule is less than a page of the physical memory.

22. The apparatus of claim 17, wherein the privileged system code includes an operating system and a virtual machine monitor of the one or more hardware isolated virtual machines that are to execute on the hardware processor core.

23. The apparatus of claim 17, wherein, in response to a request from the privileged system code to provide a function to a trust domain to execute, the trust domain manager is to store the function in the protected memory, and assign each granule of memory utilized to store the function a same micro-context identification value.

24. The apparatus of claim 17, wherein, in response to a request from the privileged system code to store data into the protected memory, the trust domain manager is to overwrite any assigned micro-context identification values with a micro-context identification value for code that is currently executing.

* * * * *